US012598556B2

(12) United States Patent
Yuan et al.

(10) Patent No.: US 12,598,556 B2
(45) Date of Patent: Apr. 7, 2026

(54) TECHNIQUES FOR LATENCY REDUCTION FOR PATH LOSS REFERENCE SIGNAL ACTIVATION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/557,848

(22) PCT Filed: Jul. 23, 2021

(86) PCT No.: PCT/CN2021/108128
§ 371 (c)(1),
(2) Date: Oct. 27, 2023

(87) PCT Pub. No.: WO2023/000301
PCT Pub. Date: Jan. 26, 2023

(65) Prior Publication Data
US 2024/0214946 A1 Jun. 27, 2024

(51) Int. Cl.
*H04W 52/24* (2009.01)

(52) U.S. Cl.
CPC ................................. *H04W 52/242* (2013.01)

(58) Field of Classification Search
CPC .......................... H04W 52/242; H04W 52/146
See application file for complete search history.

(56) References Cited

U.S. PATENT DOCUMENTS

| | | | | |
|---|---|---|---|---|
| 2020/0351794 A1* | 11/2020 | Xu | ..................... | H04B 7/06952 |
| 2021/0084510 A1* | 3/2021 | Ryu | .................... | H04W 52/325 |
| 2021/0105765 A1* | 4/2021 | Cirik | .................... | H04B 7/0696 |
| 2021/0185618 A1 | 6/2021 | Zhou et al. | | |

(Continued)

FOREIGN PATENT DOCUMENTS

CN 112713977 A 4/2021

OTHER PUBLICATIONS

International Search Report and Written Opinion—PCT/CN2021/108128—ISA/EPO—Apr. 19, 2022.

(Continued)

*Primary Examiner* — Fayyaz Alam
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a medium access control (MAC) control element (CE) (MAC-CE) including an activation command associated with activating a periodic path loss reference signal (PL-RS). The UE may receive an indication associated with a temporary PL-RS, the temporary PL-RS and the periodic PL-RS being used to estimate path loss for a period of time after the reception of the activation command. The UE may transmit an uplink signal having a transmit power based at least in part on a path loss estimate, the path loss estimate being generated based at least in part on the temporary PL-RS and the periodic PL-RS. Numerous other aspects are described.

30 Claims, 10 Drawing Sheets

(56)     References Cited

U.S. PATENT DOCUMENTS

| | | | | |
|---|---|---|---|---|
| 2021/0195530 A1* | 6/2021 | Venugopal | .......... | H04W 52/146 |
| 2022/0394626 A1* | 12/2022 | Matsumura | ........... | H04W 72/04 |
| 2023/0189250 A1* | 6/2023 | Go | ........................... | H04L 5/14 |
| | | | | 370/329 |
| 2023/0261719 A1* | 8/2023 | Liu | ....................... | H04L 5/0051 |
| | | | | 375/267 |
| 2023/0345505 A1* | 10/2023 | Guo | ....................... | H04L 5/0053 |

OTHER PUBLICATIONS

OPPO: "Discussion on Multi-Beam Operation Enhancements", 3GPP Draft, 3GPP TSG RAN WG1 #98bis, R1-1910117, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 4, 2019 (Oct. 4, 2019), XP051808071, 11 pages.
Qualcomm Incorporated: "Enhancements on Multi-Beam Operation", 3GPP TSG RAN WG1 Meeting #100-Bis-e, R1-2002552, Apr. 20-Apr. 30, 2020 Apr. 30, 2020 (Apr. 30, 2020), pp. 1-8, the whole document.
ZTE: "Maintenance of Enhancements on Multi-Beam Operation", 3GPP TSG RAN WG1 Meeting #100bis-e, R1-2001597, e-Meeting, Apr. 20-Apr. 30, 2020, Sections, 2.1, 2.2, 13 Pages, the whole document.

* cited by examiner

305
MAC-CE including periodic
PL-RS activation command

310
Indication associated
with temporary PL-RS

315
Generate path loss
estimate based at least in
part on temporary PL-RS

320
Uplink signal having transmit
power based at least in part on
path loss estimate Base
Station
110

UE
120

300

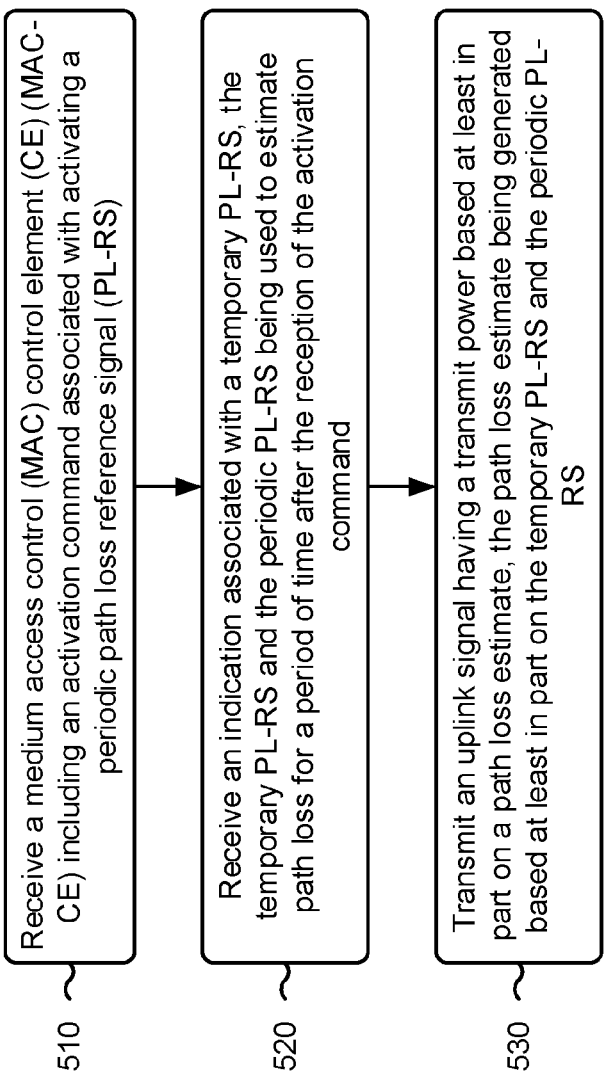

510 — Receive a medium access control (MAC) control element (CE) (MAC-CE) including an activation command associated with activating a periodic path loss reference signal (PL-RS)

520 — Receive an indication associated with a temporary PL-RS, the temporary PL-RS and the periodic PL-RS being used to estimate path loss for a period of time after the reception of the activation command 530 — Transmit an uplink signal having a transmit power based at least in part on a path loss estimate, the path loss estimate being generated based at least in part on the temporary PL-RS and the periodic PL-RS

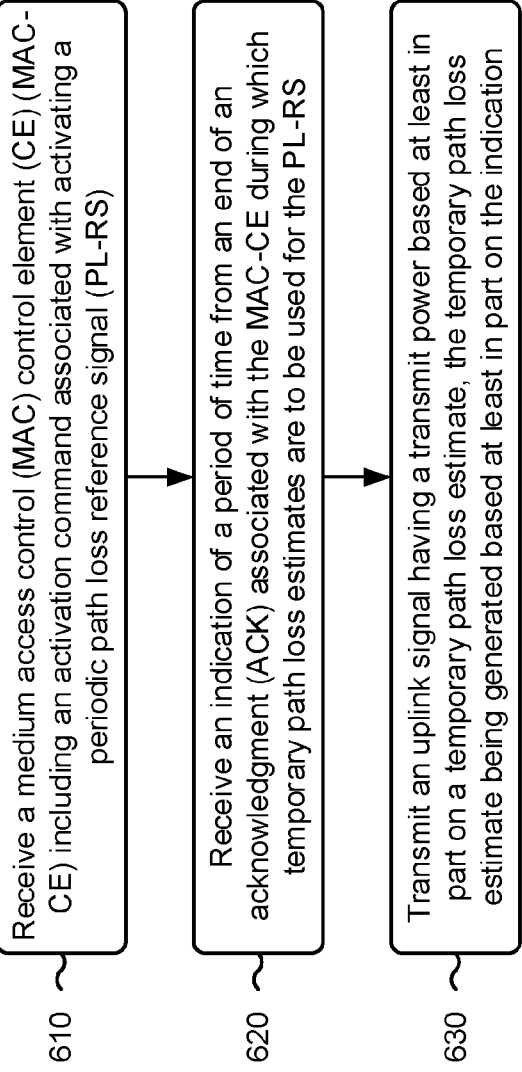

610 — Receive a medium access control (MAC) control element (CE) (MAC-CE) including an activation command associated with activating a periodic path loss reference signal (PL-RS)

620 — Receive an indication of a period of time from an end of an acknowledgment (ACK) associated with the MAC-CE during which temporary path loss estimates are to be used for the PL-RS 630 — Transmit an uplink signal having a transmit power based at least in part on a temporary path loss estimate, the temporary path loss estimate being generated based at least in part on the indication

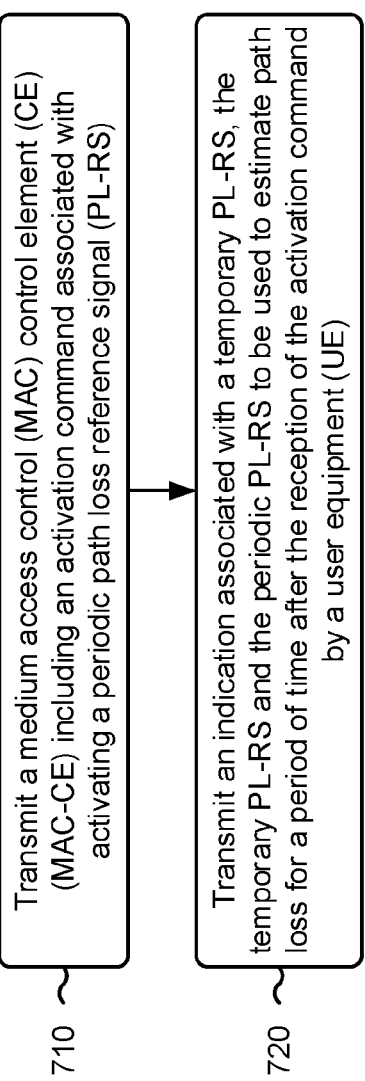

710 — Transmit a medium access control (MAC) control element (CE) (MAC-CE) including an activation command associated with activating a periodic path loss reference signal (PL-RS)

720 — Transmit an indication associated with a temporary PL-RS, the temporary PL-RS and the periodic PL-RS to be used to estimate path loss for a period of time after the reception of the activation command by a user equipment (UE)

810   Transmit a medium access control (MAC) control element (CE) (MAC-CE) including an activation command associated with activating a periodic path loss reference signal (PL-RS)

820   Transmit an indication of a period of time from an end of an acknowledgment (ACK) associated with the MAC-CE during which temporary path loss estimates are to be used for the PL-RS

800

TECHNIQUES FOR LATENCY REDUCTION FOR PATH LOSS REFERENCE SIGNAL ACTIVATION

CROSS-REFERENCE TO RELATED APPLICATION

This Patent Application is a 371 National Stage of Patent Cooperation Treaty (PCT) Patent Application No. PCT/CN2021/108128, filed on Jul. 23, 2021, entitled "TECHNIQUES FOR LATENCY REDUCTION FOR PATH LOSS REFERENCE SIGNAL ACTIVATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for latency reduction for a path loss reference signal (PL-RS) activation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE. NR, and other radio access technologies remain useful.

SUMMARY

Some aspects described herein relate to a method of wireless communication performed by a user equipment (UE). The method may include receiving a medium access control (MAC) control element (CE) (MAC-CE) including an activation command associated with activating a periodic path loss reference signal (PL-RS). The method may include receiving an indication associated with a temporary PL-RS, the temporary PL-RS and the periodic PL-RS being used to estimate path loss for a period of time after the reception of the activation command. The method may include transmitting an uplink signal having a transmit power based at least in part on a path loss estimate, the path loss estimate being generated based at least in part on the temporary PL-RS and the periodic PL-RS.

In some aspects, the temporary PL-RS is a semi-persistent PL-RS that is activated by the activation command.

In some aspects, the temporary PL-RS is an aperiodic PL-RS that is triggered by the activation command.

In some aspects, the temporary PL-RS is an aperiodic PL-RS that is triggered by downlink control information (DCI) that is separate from the activation command.

In some aspects, the temporary PL-RS is quasi co-located with the periodic PL-RS.

In some aspects, the temporary PL-RS is indicated by a channel state information (CSI) trigger state for a CSI report configuration.

In some aspects, the CSI report configuration indicates a channel measurement resource (CMR) of an aperiodic CSI as the temporary PL-RS.

In some aspects, the CMR is a first CMR, and one or more other CMRs indicated by the CSI report configuration are quasi co-located to the periodic PL-RS, quasi co-location information is indicated by the MAC-CE or by DCI.

In some aspects, a CSI report quantity associated with the CSI report configuration is set to "pathloss."

In some aspects, an offset associated with an aperiodic CSI resource set is indicated with the CSI trigger state.

In some aspects, a slot from which the offset is counted is at an end of a slot carrying an acknowledgement (ACK) associated with the MAC-CE or an end of a slot in which DCI is received.

In some aspects, repetition is enabled for an aperiodic CSI resource set associated with the CSI report configuration.

In some aspects, the temporary PL-RS is indicated by a CSI resource set configuration.

In some aspects, the CSI resource set configuration indicates a CMR of a semi-persistent CSI as the temporary PL-RS.

In some aspects, the CMR is a first CMR, and one or more other CMRs indicated by the CSI resource set are quasi co-located to the periodic PL-RS, quasi co-location information is indicated by the MAC-CE.

Some aspects described herein relate to a method of wireless communication performed by a UE. The method may include receiving a MAC-CE including an activation command associated with activating a periodic PL-RS. The method may include receiving an indication of a period of time from an end of an ACK associated with the MAC-CE during which temporary path loss estimates are to be used for the PL-RS. The method may include transmitting an uplink signal having a transmit power based at least in part on a temporary path loss estimate, the temporary path loss estimate being generated based at least in part on the indication.

In some aspects, a length of the period of time is shorter than a length of a period of time associated with generating a normal path loss estimate.

In some aspects, the temporary path loss estimate is generated based at least in part on a particular quantity of PL-RS samples obtained during the period of time.

In some aspects, the temporary path loss estimate is generated based at least in part on an received signal received power (RSRP) measurement associated with the PL-RS.

Some aspects described herein relate to a method of wireless communication performed by a base station. The method may include transmitting a MAC-CE including an activation command associated with activating a periodic PL-RS. The method may include transmitting an indication associated with a temporary PL-RS, the temporary PL-RS and the periodic PL-RS to be used to estimate path loss for a period of time after the reception of the activation command by a UE.

In some aspects, the temporary PL-RS is a semi-persistent PL-RS that is activated by the activation command.

In some aspects, the temporary PL-RS is an aperiodic PL-RS that is triggered by the activation command.

In some aspects, the temporary PL-RS is an aperiodic PL-RS that is triggered by DCI that is separate from the activation command.

In some aspects, the temporary PL-RS is quasi co-located with the periodic PL-RS.

In some aspects, the temporary PL-RS is indicated by a CSI trigger state for a CSI report configuration.

In some aspects, the CSI report configuration indicates a CMR of an aperiodic CSI as the temporary PL-RS.

In some aspects, the CMR is a first CMR, and one or more other CMRs indicated by the CSI report configuration are quasi co-located to the periodic PL-RS, quasi co-location information is indicated by the MAC-CE or by DCI.

In some aspects, a CSI report quantity associated with the CSI report configuration is set to "path loss."

In some aspects, an offset associated with an aperiodic CSI resource set is indicated with the CSI trigger state.

In some aspects, a slot from which the offset is counted is at an end of a slot carrying an ACK associated with the MAC-CE or an end of a slot in which DCI is received.

In some aspects, repetition is enabled for an aperiodic CSI resource set associated with the CSI report configuration.

In some aspects, the temporary PL-RS is indicated by a CSI resource set configuration.

In some aspects, the CSI resource set configuration indicates a CMR of a semi-persistent CSI as the temporary PL-RS.

In some aspects, the CMR is a first CMR, and one or more other CMRs indicated by the CSI resource set are quasi co-located to the periodic PL-RS, quasi co-location information is indicated by the MAC-CE.

Some aspects described herein relate to a method of wireless communication performed by a base station. The method may include transmitting a MAC-CE including an activation command associated with activating a periodic PL-RS. The method may include transmitting an indication of a period of time from an end of an ACK associated with the MAC-CE during which temporary path loss estimates are to be used for the PL-RS.

In some aspects, a length of the period of time is shorter than a length of a period of time associated with generating a normal path loss estimate.

In some aspects, the temporary path loss estimate is based at least in part on a particular quantity of PL-RS samples obtained during the period of time.

In some aspects, the temporary path loss estimate is based at least in part on an RSRP measurement associated with the PL-RS.

Some aspects described herein relate to a UE for wireless communication. The user equipment may include a memory and one or more processors coupled to the memory. The one or more processors may be configured to receive a MAC-CE including an activation command associated with activating a periodic PL-RS. The one or more processors may be configured to receive an indication associated with a temporary PL-RS, the temporary PL-RS and the periodic PL-RS being used to estimate path loss for a period of time after the reception of the activation command. The one or more processors may be configured to transmit an uplink signal having a transmit power based at least in part on a path loss estimate, the path loss estimate being generated based at least in part on the temporary PL-RS and the periodic PL-RS.

In some aspects, the temporary PL-RS is a semi-persistent PL-RS that is activated by the activation command.

In some aspects, the temporary PL-RS is an aperiodic PL-RS that is triggered by the activation command.

In some aspects, the temporary PL-RS is an aperiodic PL-RS that is triggered by DCI that is separate from the activation command.

In some aspects, the temporary PL-RS is quasi co-located with the periodic PL-RS.

In some aspects, the temporary PL-RS is indicated by a CSI trigger state for a CSI report configuration.

In some aspects, the CSI report configuration indicates a CMR of an aperiodic CSI as the temporary PL-RS.

In some aspects, the CMR is a first CMR, and one or more other CMRs indicated by the CSI report configuration are quasi co-located to the periodic PL-RS, quasi co-location information is indicated by the MAC-CE or by DCI.

In some aspects, a CSI report quantity associated with the CSI report configuration is set to "pathloss."

In some aspects, an offset associated with an aperiodic CSI resource set is indicated with the CSI trigger state.

In some aspects, a slot from which the offset is counted is at an end of a slot carrying an ACK associated with the MAC-CE or an end of a slot in which DCI is received.

In some aspects, repetition is enabled for an aperiodic CSI resource set associated with the CSI report configuration.

In some aspects, the temporary PL-RS is indicated by a CSI resource set configuration.

In some aspects, the CSI resource set configuration indicates a CMR of a semi-persistent CSI as the temporary PL-RS.

In some aspects, the CMR is a first CMR, and one or more other CMRs indicated by the CSI resource set are quasi co-located to the periodic PL-RS, quasi co-location information is indicated by the MAC-CE.

Some aspects described herein relate to a UE for wireless communication. The UE may include a memory and one or more processors coupled to the memory. The one or more processors may be configured to receive a MAC-CE including an activation command associated with activating a periodic PL-RS. The one or more processors may be configured to receive an indication of a period of time from an end of an ACK associated with the MAC-CE during which temporary path loss estimates are to be used for the PL-RS. The one or more processors may be configured to transmit an uplink signal having a transmit power based at least in part on a temporary path loss estimate, the temporary path loss estimate being generated based at least in part on the indication.

In some aspects, a length of the period of time is shorter than a length of a period of time associated with generating a normal path loss estimate.

In some aspects, the temporary path loss estimate is generated based at least in part on a particular quantity of PL-RS samples obtained during the period of time.

In some aspects, the temporary path loss estimate is generated based at least in part on an RSRP measurement associated with the PL-RS.

Some aspects described herein relate to a base station for wireless communication. The base station may include a memory and one or more processors coupled to the memory. The one or more processors may be configured to transmit a MAC-CE including an activation command associated with activating a periodic PL-RS. The one or more processors may be configured to transmit an indication associated with a temporary PL-RS, the temporary PL-RS and the periodic PL-RS to be used to estimate path loss for a period of time after the reception of the activation command by a UE.

In some aspects, the temporary PL-RS is a semi-persistent PL-RS that is activated by the activation command.

In some aspects, the temporary PL-RS is an aperiodic PL-RS that is triggered by the activation command.

In some aspects, the temporary PL-RS is an aperiodic PL-RS that is triggered by DCI that is separate from the activation command.

In some aspects, the temporary PL-RS is quasi co-located with the periodic PL-RS.

In some aspects, the temporary PL-RS is indicated by a CSI trigger state for a CSI report configuration.

In some aspects, the CSI report configuration indicates a CMR of an aperiodic CSI as the temporary PL-RS.

In some aspects, the CMR is a first CMR, and one or more other CMRs indicated by the CSI report configuration are quasi co-located to the periodic PL-RS, quasi co-location information is indicated by the MAC-CE or by DCI.

In some aspects, a CSI report quantity associated with the CSI report configuration is set to "path loss."

In some aspects, an offset associated with an aperiodic CSI resource set is indicated with the CSI trigger state.

In some aspects, a slot from which the offset is counted is at an end of a slot carrying an ACK associated with the MAC-CE or an end of a slot in which DCI is received.

In some aspects, repetition is enabled for an aperiodic CSI resource set associated with the CSI report configuration.

In some aspects, the temporary PL-RS is indicated by a CSI resource set configuration.

In some aspects, the CSI resource set configuration indicates a CMR of a semi-persistent CSI as the temporary PL-RS.

In some aspects, the CMR is a first CMR, and one or more other CMRs indicated by the CSI resource set are quasi co-located to the periodic PL-RS, quasi co-location information is indicated by the MAC-CE.

Some aspects described herein relate to a base station for wireless communication. The base station may include a memory and one or more processors coupled to the memory. The one or more processors may be configured to transmit a MAC-CE including an activation command associated with activating a periodic PL-RS. The one or more processors may be configured to transmit an indication of a period of time from an end of an ACK associated with the MAC-CE during which temporary path loss estimates are to be used for the PL-RS.

In some aspects, a length of the period of time is shorter than a length of a period of time associated with generating a normal path loss estimate.

In some aspects, the temporary path loss estimate is based at least in part on a particular quantity of PL-RS samples obtained during the period of time.

In some aspects, the temporary path loss estimate is based at least in part on an RSRP measurement associated with the PL-RS.

Some aspects described herein relate to a non-transitory computer-readable medium that stores a set of instructions for wireless communication by a UE. The set of instructions, when executed by one or more processors of the UE, may cause the UE to receive a MAC-CE including an activation command associated with activating a periodic PL-RS. The set of instructions, when executed by one or more processors of the UE, may cause the UE to receive an indication associated with a temporary PL-RS, the temporary PL-RS and the periodic PL-RS being used to estimate path loss for a period of time after the reception of the activation command. The set of instructions, when executed by one or more processors of the UE, may cause the UE to transmit an uplink signal having a transmit power based at least in part on a path loss estimate, the path loss estimate being generated based at least in part on the temporary PL-RS and the periodic PL-RS.

In some aspects, the temporary PL-RS is a semi-persistent PL-RS that is activated by the activation command.

In some aspects, the temporary PL-RS is an aperiodic PL-RS that is triggered by the activation command.

In some aspects, the temporary PL-RS is an aperiodic PL-RS that is triggered by DCI that is separate from the activation command.

In some aspects, the temporary PL-RS is quasi co-located with the periodic PL-RS.

In some aspects, the temporary PL-RS is indicated by a CSI trigger state for a CSI report configuration.

In some aspects, the CSI report configuration indicates a CMR of an aperiodic CSI as the temporary PL-RS.

In some aspects, the CMR is a first CMR, and one or more other CMRs indicated by the CSI report configuration are quasi co-located to the periodic PL-RS, quasi co-location information is indicated by the MAC-CE or by DCI.

In some aspects, a CSI report quantity associated with the CSI report configuration is set to "pathloss."

In some aspects, an offset associated with an aperiodic CSI resource set is indicated with the CSI trigger state.

In some aspects, a slot from which the offset is counted is at an end of a slot carrying an ACK associated with the MAC-CE or an end of a slot in which DCI is received.

In some aspects, repetition is enabled for an aperiodic CSI resource set associated with the CSI report configuration.

In some aspects, the temporary PL-RS is indicated by a CSI resource set configuration.

In some aspects, the CSI resource set configuration indicates a CMR of a semi-persistent CSI as the temporary PL-RS.

In some aspects, the CMR is a first CMR, and one or more other CMRs indicated by the CSI resource set are quasi co-located to the periodic PL-RS, quasi co-location information is indicated by the MAC-CE.

Some aspects described herein relate to a non-transitory computer-readable medium that stores a set of instructions for wireless communication by a one or more instructions that, when executed by one or more processors of an UE. The set of instructions, when executed by one or more processors of the one or more instructions that, when executed by one or more processors of an UE, may cause the one or more instructions that, when executed by one or more processors of an UE to receive a MAC-CE including an activation command associated with activating a periodic PL-RS. The set of instructions, when executed by one or more processors of the one or more instructions that, when executed by one or more processors of an UE, may cause the one or more instructions that, when executed by one or more processors of an UE to receive an indication of a period of time from an end of an ACK associated with the MAC-CE during which temporary path loss estimates are to be used for the PL-RS. The set of instructions, when executed by one or more processors of the one or more instructions that, when executed by one or more processors of an UE, may cause the one or more instructions that, when executed by one or more processors of an UE to transmit an uplink signal having a transmit power based at least in part on a temporary path loss estimate, the temporary path loss estimate being generated based at least in part on the indication.

In some aspects, a length of the period of time is shorter than a length of a period of time associated with generating a normal path loss estimate.

In some aspects, the temporary path loss estimate is generated based at least in part on a particular quantity of PL-RS samples obtained during the period of time.

In some aspects, the temporary path loss estimate is generated based at least in part on an RSRP measurement associated with the PL-RS.

Some aspects described herein relate to a non-transitory computer-readable medium that stores a set of instructions for wireless communication by a base station. The set of instructions, when executed by one or more processors of the base station, may cause the base station to transmit a MAC-CE including an activation command associated with activating a periodic PL-RS. The set of instructions, when executed by one or more processors of the base station, may cause the base station to transmit an indication associated with a temporary PL-RS, the temporary PL-RS and the periodic PL-RS to be used to estimate path loss for a period of time after the reception of the activation command by a UE.

In some aspects, the temporary PL-RS is a semi-persistent PL-RS that is activated by the activation command.

In some aspects, the temporary PL-RS is an aperiodic PL-RS that is triggered by the activation command.

In some aspects, the temporary PL-RS is an aperiodic PL-RS that is triggered by DCI that is separate from the activation command.

In some aspects, the temporary PL-RS is quasi co-located with the periodic PL-RS.

In some aspects, the temporary PL-RS is indicated by a CSI trigger state for a CSI report configuration.

In some aspects, the CSI report configuration indicates a CMR of an aperiodic CSI as the temporary PL-RS.

In some aspects, the CMR is a first CMR, and one or more other CMRs indicated by the CSI report configuration are quasi co-located to the periodic PL-RS, quasi co-location information is indicated by the MAC-CE or by DCI.

In some aspects, a CSI report quantity associated with the CSI report configuration is set to "path loss."

In some aspects, an offset associated with an aperiodic CSI resource set is indicated with the CSI trigger state.

In some aspects, a slot from which the offset is counted is at an end of a slot carrying an ACK associated with the MAC-CE or an end of a slot in which DCI is received.

In some aspects, repetition is enabled for an aperiodic CSI resource set associated with the CSI report configuration.

In some aspects, the temporary PL-RS is indicated by a CSI resource set configuration.

In some aspects, the CSI resource set configuration indicates a CMR of a semi-persistent CSI as the temporary PL-RS.

In some aspects, the CMR is a first CMR, and one or more other CMRs indicated by the CSI resource set are quasi co-located to the periodic PL-RS, quasi co-location information is indicated by the MAC-CE.

Some aspects described herein relate to a non-transitory computer-readable medium that stores a set of instructions for wireless communication by a base station. The set of instructions, when executed by one or more processors of the base station, may cause the base station to transmit a MAC-CE including an activation command associated with activating a periodic PL-RS. The set of instructions, when executed by one or more processors of the base station, may cause the base station to transmit an indication of a period of time from an end of an ACK associated with the MAC-CE during which temporary path loss estimates are to be used for the PL-RS.

In some aspects, a length of the period of time is shorter than a length of a period of time associated with generating a normal path loss estimate.

In some aspects, the temporary path loss estimate is based at least in part on a particular quantity of PL-RS samples obtained during the period of time.

In some aspects, the temporary path loss estimate is based at least in part on an RSRP measurement associated with the PL-RS.

Some aspects described herein relate to an apparatus for wireless communication. The apparatus may include means for receiving a MAC-CE including an activation command associated with activating a periodic PL-RS. The apparatus may include means for receiving an indication associated with a temporary PL-RS, the temporary PL-RS and the periodic PL-RS being used to estimate path loss for a period of time after the reception of the activation command. The apparatus may include means for transmitting an uplink signal having a transmit power based at least in part on a path loss estimate, the path loss estimate being generated based at least in part on the temporary PL-RS and the periodic PL-RS.

In some aspects, the temporary PL-RS is a semi-persistent PL-RS that is activated by the activation command.

In some aspects, the temporary PL-RS is an aperiodic PL-RS that is triggered by the activation command.

In some aspects, the temporary PL-RS is an aperiodic PL-RS that is triggered by DCI that is separate from the activation command.

In some aspects, the temporary PL-RS is quasi co-located with the periodic PL-RS.

In some aspects, the temporary PL-RS is indicated by a CSI trigger state for a CSI report configuration.

In some aspects, the CSI report configuration indicates a CMR of an aperiodic CSI as the temporary PL-RS.

In some aspects, the CMR is a first CMR, and one or more other CMRs indicated by the CSI report configuration are quasi co-located to the periodic PL-RS, quasi co-location information is indicated by the MAC-CE or by DCI.

In some aspects, a CSI report quantity associated with the CSI report configuration is set to "pathloss."

In some aspects, an offset associated with an aperiodic CSI resource set is indicated with the CSI trigger state.

In some aspects, a slot from which the offset is counted is at an end of a slot carrying an ACK associated with the MAC-CE or an end of a slot in which DCI is received.

In some aspects, repetition is enabled for an aperiodic CSI resource set associated with the CSI report configuration.

In some aspects, the temporary PL-RS is indicated by a CSI resource set configuration.

In some aspects, the CSI resource set configuration indicates a CMR of a semi-persistent CSI as the temporary PL-RS.

In some aspects, the CMR is a first CMR, and one or more other CMRs indicated by the CSI resource set are quasi co-located to the periodic PL-RS, quasi co-location information is indicated by the MAC-CE.

Some aspects described herein relate to an apparatus for wireless communication. The apparatus may include means for receiving a MAC-CE including an activation command associated with activating a periodic PL-RS. The apparatus may include means for receiving an indication of a period of time from an end of an ACK associated with the MAC-CE during which temporary path loss estimates are to be used for the PL-RS. The apparatus may include means for transmitting an uplink signal having a transmit power based at least in part on a temporary path loss estimate, the temporary path loss estimate being generated based at least in part on the indication.

In some aspects, a length of the period of time is shorter than a length of a period of time associated with generating a normal path loss estimate.

In some aspects, the temporary path loss estimate is generated based at least in part on a particular quantity of PL-RS samples obtained during the period of time.

In some aspects, the temporary path loss estimate is generated based at least in part on an RSRP measurement associated with the PL-RS.

Some aspects described herein relate to an apparatus for wireless communication. The apparatus may include means for transmitting a MAC-CE including an activation command associated with activating a periodic PL-RS. The apparatus may include means for transmitting an indication associated with a temporary PL-RS, the temporary PL-RS and the periodic PL-RS to be used to estimate path loss for a period of time after the reception of the activation command by a UE.

In some aspects, the temporary PL-RS is a semi-persistent PL-RS that is activated by the activation command.

In some aspects, the temporary PL-RS is an aperiodic PL-RS that is triggered by the activation command.

In some aspects, the temporary PL-RS is an aperiodic PL-RS that is triggered by DCI that is separate from the activation command.

In some aspects, the temporary PL-RS is quasi co-located with the periodic PL-RS.

In some aspects, the temporary PL-RS is indicated by a CSI trigger state for a CSI report configuration.

In some aspects, the CSI report configuration indicates a CMR of an aperiodic CSI as the temporary PL-RS.

In some aspects, the CMR is a first CMR, and one or more other CMRs indicated by the CSI report configuration are quasi co-located to the periodic PL-RS, quasi co-location information is indicated by the MAC-CE or by DCI.

In some aspects, a CSI report quantity associated with the CSI report configuration is set to "path loss."

In some aspects, an offset associated with an aperiodic CSI resource set is indicated with the CSI trigger state.

In some aspects, a slot from which the offset is counted is at an end of a slot carrying an ACK associated with the MAC-CE or an end of a slot in which DCI is received.

In some aspects, repetition is enabled for an aperiodic CSI resource set associated with the CSI report configuration.

In some aspects, the temporary PL-RS is indicated by a CSI resource set configuration.

In some aspects, the CSI resource set configuration indicates a CMR of a semi-persistent CSI as the temporary PL-RS.

In some aspects, the CMR is a first CMR, and one or more other CMRs indicated by the CSI resource set are quasi co-located to the periodic PL-RS, quasi co-location information is indicated by the MAC-CE.

Some aspects described herein relate to an apparatus for wireless communication. The apparatus may include means for transmitting a MAC-CE including an activation command associated with activating a periodic PL-RS. The apparatus may include means for transmitting an indication of a period of time from an end of an ACK associated with the MAC-CE during which temporary path loss estimates are to be used for the PL-RS.

In some aspects, a length of the period of time is shorter than a length of a period of time associated with generating a normal path loss estimate.

In some aspects, the temporary path loss estimate is based at least in part on a particular quantity of PL-RS samples obtained during the period of time.

In some aspects, the temporary path loss estimate is based at least in part on an RSRP measurement associated with the PL-RS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-8 are diagrams illustrating example processes associated with signal overhead and latency reduction for a PL-RS, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
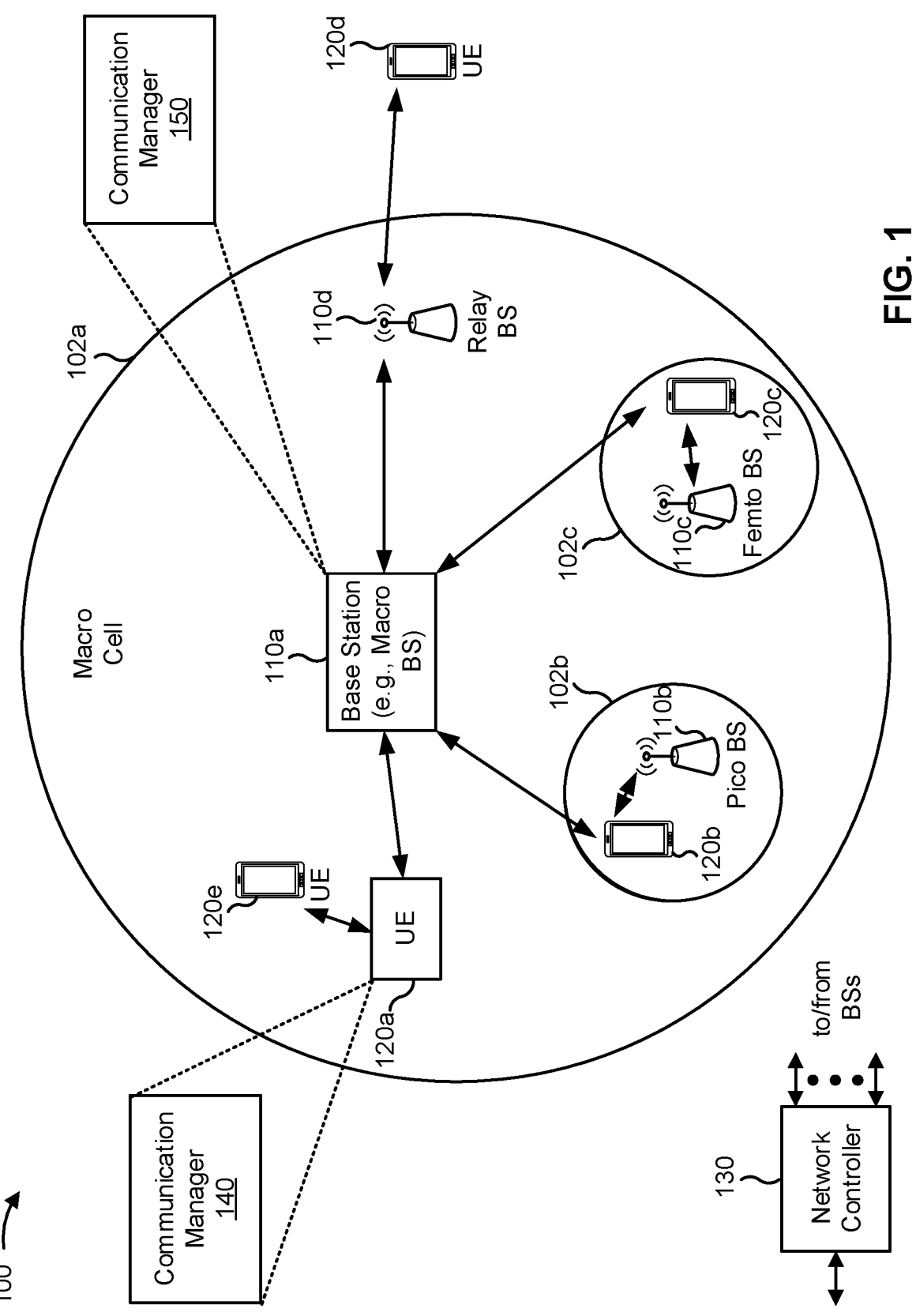
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases. NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHz-52.6 GHz). It should be understood that although a portion of FR1 is greater than 6 GHz. FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz). FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHZ" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2. FR4. FR4-a or FR4-1, and/or FR5, or may be within the EHF band. It is contemplated that the frequencies included in these operating bands (e.g., FR1. FR2. FR3. FR4. FR4-a. FR4-1, and/or FR5) may be modified, and techniques described herein are applicable to those modified frequency ranges.

In some aspects, the UE 120 may include a communication manager 140. As described in more detail elsewhere herein, the communication manager 140 may receive a medium access control (MAC) control element (CE) (MAC-CE) including an activation command associated with activating a periodic path loss reference signal (PL-RS): receive an indication associated with a temporary PL-RS, the temporary PL-RS and the periodic PL-RS being used to estimate path loss for a period of time after the reception of the activation command; and transmit an uplink signal having a transmit power based at least in part on a path loss estimate, the path loss estimate being generated based at least in part on the temporary PL-RS and the periodic PL-RS. Additionally, or alternatively, the communication manager 140 may perform one or more other operations described herein.

In some aspects, the UE 120 may include a communication manager 140. As described in more detail elsewhere herein, the communication manager 140 may receive a MAC-CE including an activation command associated with activating a periodic PL-RS; receive an indication of a period of time from an end of an acknowledgment (ACK) associated with the MAC-CE during which temporary path loss estimates are to be used for the PL-RS: and transmit an uplink signal having a transmit power based at least in part on a temporary path loss estimate, the temporary path loss estimate being generated based at least in part on the indication. Additionally, or alternatively, the communication manager 140 may perform one or more other operations described herein.

In some aspects, the base station 110 may include a communication manager 150. As described in more detail elsewhere herein, the communication manager 150 may transmit a MAC-CE including an activation command associated with activating a periodic PL-RS: and transmit an indication associated with a temporary PL-RS, the temporary PL-RS and the periodic PL-RS to be used to estimate path loss for a period of time after the reception of the activation command by a UE. Additionally, or alternatively, the communication manager 150 may perform one or more other operations described herein.

In some aspects, the base station 110 may include a communication manager 150. As described in more detail elsewhere herein, the communication manager 150 may transmit a MAC-CE including an activation command associated with activating a periodic PL-RS: and transmit an indication of a period of time from an end of an ACK associated with the MAC-CE during which temporary path loss estimates are to be used for the PL-RS. Additionally, or alternatively, the communication manager 150 may perform one or more other operations described herein.

As indicated above. FIG. 1 is provided as an example. Other examples may differ from what is described with regard to FIG. 1.

Figure 2:
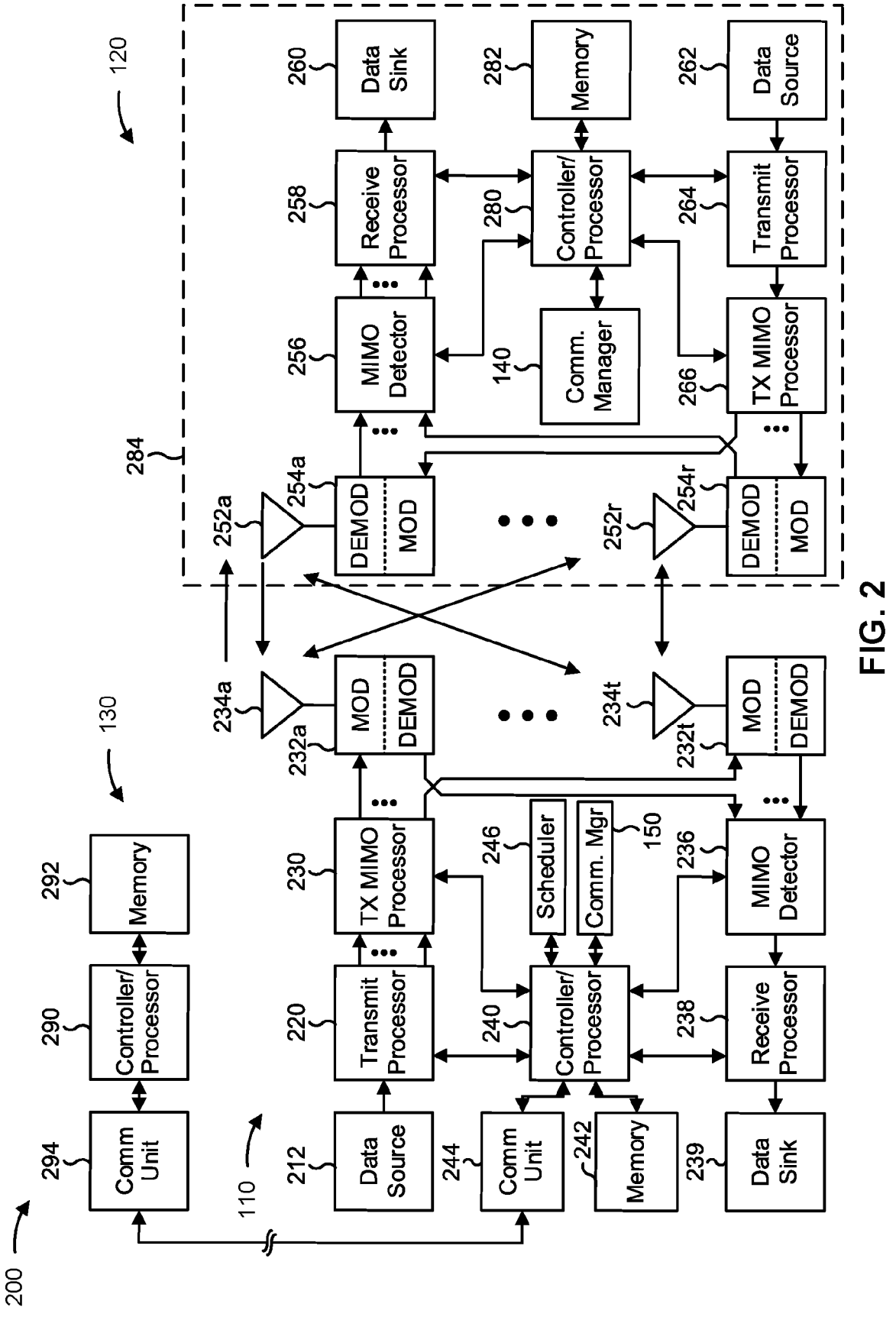
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP. RSSI. RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with latency reduction for a PL-RS activation, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE includes means for receiving a MAC-CE including an activation command associated with activating a periodic PL-RS: means for receiving an indication associated with a temporary PL-RS, the temporary PL-RS and the periodic PL-RS being used to estimate path loss for a period of time after the reception of the activation command: and/or means for transmitting an uplink signal having a transmit power based at least in part on a path loss estimate, the path loss estimate being generated based at least in part on the temporary PL-RS and the periodic PL-RS. The means for the UE to perform operations described herein may include, for example, one or more of communication manager 140, antenna 252, modem 254. MIMO detector 256, receive processor 258, transmit processor 264. TX MIMO processor 266, controller/processor 280, or memory 282.

In some aspects, a UE includes means for receiving a MAC-CE including an activation command associated with activating a periodic PL-RS: means for receiving an indication of a period of time from an end of an ACK associated with the MAC-CE during which temporary path loss estimates are to be used for the PL-RS: and/or means for transmitting an uplink signal having a transmit power based at least in part on a temporary path loss estimate, the temporary path loss estimate being generated based at least in part on the indication. The means for the UE to perform operations described herein may include, for example, one or more of communication manager 140, antenna 252, modem 254. MIMO detector 256, receive processor 258, transmit processor 264. TX MIMO processor 266, controller/processor 280, or memory 282.

In some aspects, the base station includes means for transmitting a MAC-CE including an activation command associated with activating a periodic PL-RS: and/or means for transmitting an indication associated with a temporary PL-RS, the temporary PL-RS and the periodic PL-RS to be used to estimate path loss for a period of time after the reception of the activation command by a UE. The means for the base station to perform operations described herein may include, for example, one or more of communication manager 150, transmit processor 220. TX MIMO processor 230, modem 232, antenna 234. MIMO detector 236, receive processor 238, controller/processor 240, memory 242, or scheduler 246.

In some aspects, the base station includes means for transmitting a MAC-CE including an activation command associated with activating a periodic PL-RS: and/or means for transmitting an indication of a period of time from an end of an ACK associated with the MAC-CE during which temporary path loss estimates are to be used for the PL-RS. The means for the base station to perform operations described herein may include, for example, one or more of communication manager 150, transmit processor 220. TX MIMO processor 230, modem 232, antenna 234. MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above. FIG. 2 is provided as an example. Other examples may differ from what is described with regard to FIG. 2.

A UE may be configured to receive a PL-RS from a base station in connection with an uplink power control operation of the UE. For example, the UE may perform a measurement of the PL-RS and may estimate a path loss of a channel based at least in part on the measurement of the PL-RS. The UE may then compute, based at least in part on the estimated path loss, a transmit power or transmit power adjustment to be applied by the UE for a transmission of an uplink signal (e.g., a signal carrying an uplink communication) to be received by the base station.

In some wireless communication systems, the base station may transmit an activation command, associated with activating a PL-RS to be received by the UE (e.g., in connection with performing an uplink power control operation), in a MAC-CE. However, after the UE receives the activation command in the MAC-CE, the UE needs to filter multiple PL-RS samples in association with generating a path loss estimate. The amount of time needed to filter these multiple PL-RS samples results in latency associated with activation of the PL-RS. This latency delays performance of an uplink power control operation and, therefore, delays transmission of an uplink signal.

Some techniques and apparatuses described herein enable reduction of latency associated with a PL-RS activation. In some aspects, a temporary PL-RS can be used by the UE in association with reducing the latency of the PL-RS activation (e.g., by enabling additional PL-RS measurements in a period after receipt of the activation). In some aspects, a temporary path loss estimate can be used by the UE in association with reducing the latency of the PL-RS activation. In this way, latency associated with a PL-RS activation can be reduced or eliminated.

Figure 3:
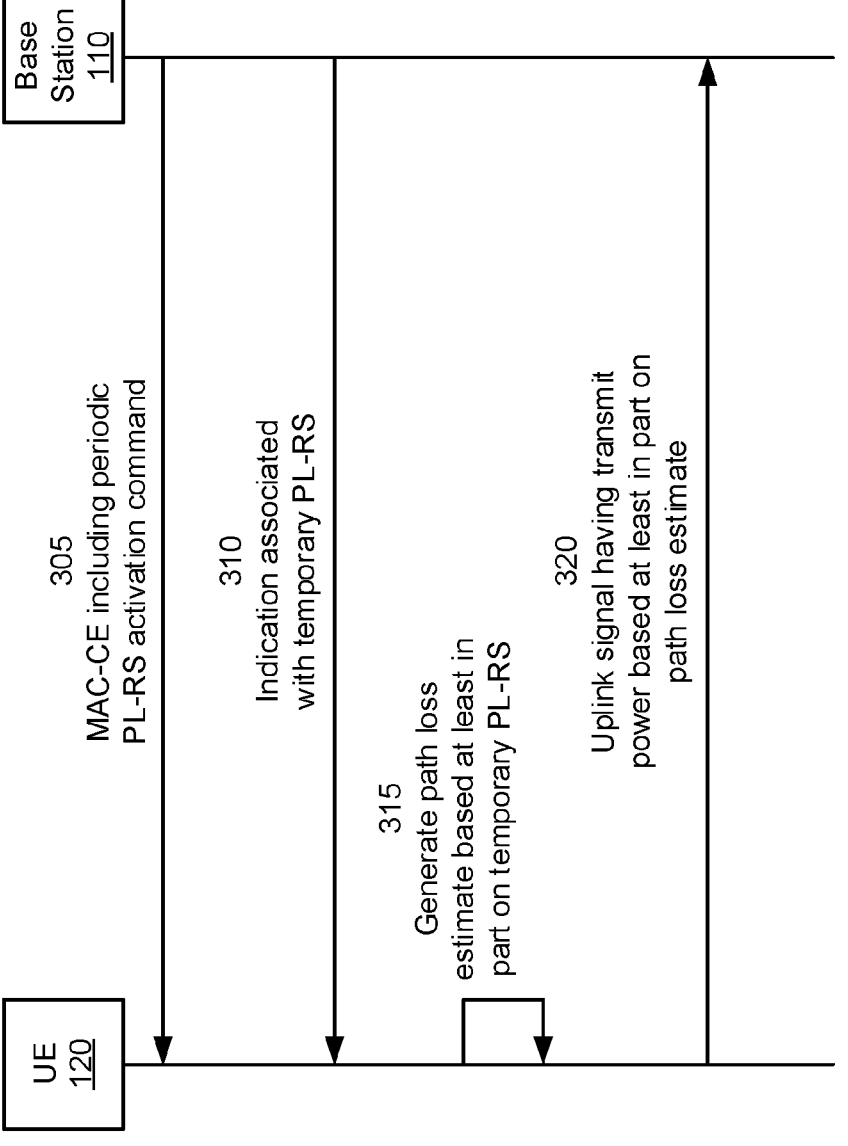
FIGS. 3 and 4 are diagrams illustrating examples associated with signal overhead and latency reduction for a path loss reference signal (PL-RS), in accordance with the present disclosure.

FIG. 3 is a diagram illustrating an example 300 associated with latency reduction for a PL-RS activation, in accordance with the present disclosure. As shown in FIG. 3, a base station 110 and a UE 120 may communicate with one another.

As shown by reference number 305, the base station 110 may transmit, and the UE 120 receive, a MAC-CE including an activation command associated with activating a PL-RS. In some aspects, the PL-RS may be configured to be periodic CSI-RS. In some aspects, the MAC-CE can activate multiple (e.g., more than four) transmission configuration indicators (TCIs) applicable to uplink channels for which the associated PL-RSs can be tracked by the UE based on a UE capability. In some aspects, the UE 120 may track the multiple PL-RSs, to avoid frequent MAC-CE activation of the PL-RSs. In some aspects, the quantity of PL-RSs tracked by the UE 120 may be based at least in part on a UE capability.

As shown by reference 310, the base station 110 may transmit, and the UE 120 may receive, an indication associated with a temporary PL-RS. In some aspects, the temporary PL-RS is a PL-RS that is to be used in association with estimating path loss on a channel between the base station 110 and the UE 120 during a period of time after the reception of the activation command (e.g., a period of time immediately following reception of the activation command). In some aspects, the temporary PL-RS is quasi co-located with the periodic PL-RS activated by the activation command.

In some aspects, the temporary PL-RS allows the UE 120 to obtain a higher quantity of PL-RS samples within the period of time (e.g., as compared to a quantity of samples that could be obtained by sampling the periodic PL-RS only). As a result, a desirable or required PL-RS measurement accuracy can be achieved. For example, in some aspects, the temporary PL-RS and the periodic PL-RS may be used to estimate path loss for the period of time after the reception of the activation command. That is, the UE 120 may estimate the path loss based on measurements associated with the temporary PL-RS and the periodic PL-RS. In some aspects, a length of the period of time may be fixed. In some aspects, the length of the period of time may be configured (e.g., by radio resource control (RRC) signaling). In some aspects, the length of the period of time may be, for example, 3 millisecond (ms).

In some aspects, the temporary PL-RS is a semi-persistent PL-RS that is activated by the activation command. In some aspects, the semi-persistent PL-RS may be a semi-persistent CSI-RS. That is, in some aspects, the temporary PL-RS is a semi-persistent PL-RS that is activated by the same activation command that activates the periodic PL-RS.

In some aspects, the temporary PL-RS is an aperiodic PL-RS that is triggered by the activation command. In some aspects, the aperiodic PL-RS may be an aperiodic CSI-RS. That is, in some aspects, the temporary PL-RS is an aperiodic PL-RS that is triggered by the same activation command that activates the periodic PL-RS.

In some aspects, the temporary PL-RS is an aperiodic PL-RS that is triggered by downlink control information (DCI) that is separate from the activation command. That is, in some aspects, the temporary PL-RS is an aperiodic PL-RS that is triggered by DCI that is separate from the activation command that activates the periodic PL-RS.

In some aspects, such as when the temporary PL-RS is an aperiodic PL-RS (e.g., triggered by the activation command or triggered by separate DCI), the temporary PL-RS is indicated by a channel state information (CSI) trigger state for a CSI report configuration.

In some aspects, the CSI report configuration indicates a channel measurement resource (CMR) of an aperiodic PL-RS as the temporary PL-RS. In some aspects, if multiple CMRs are configured in the channel measurement resources for the CSI report, then the multiple CMRs are quasi co-located (QCLed) to the periodic PL-RS. Thus, in some aspects, the CMR of the temporary PL-RS is a first CMR, and one or more other CMRs indicated by the CSI report configuration are quasi co-located to the periodic PL-RS. In some aspects, quasi co-location information associated with the one or more other CMRs is indicated by the MAC-CE (e.g., when the temporary PL-RS is an aperiodic PL-RS triggered by the activation command). In some aspects, quasi co-location information associated with the one or more other CMRs is indicated by DCI (e.g., when the temporary PL-RS is an aperiodic PL-RS triggered by DCI).

In some aspects, a CSI report quantity associated with the CSI report configuration is set with the usage for a temporary PL-RS, such as with a quantity of "pathloss." In some aspects, the CSI report having a CSI report quantity as "pathloss" (or another similar value) enables the UE 120 to not need to have any CSI report for a CSI measurement, thereby conserving resources of the UE 120 and reducing signaling overhead (e.g., since a CSI report need not be generated or transmitted by the UE 120).

In some aspects, an offset associated with an aperiodic CSI resource set is indicated with the CSI trigger state. In some aspects, a slot from which the offset is counted is at an end of a slot carrying an ACK associated with the MAC-CE (e.g., when the temporary PL-RS is an aperiodic PL-RS triggered by the activation command). In some aspects, the slot from which the offset is counted is at an end of a slot in which DCI is received (e.g., when the temporary PL-RS is an aperiodic PL-RS triggered by DCI).

In some aspects, repetition is enabled for an aperiodic CSI resource set associated with the CSI report configuration.

As a first particular example, the base station 110 may transmit, and the UE 120 may receive, a MAC-CE activating a periodic PL-RS and triggering an aperiodic temporary PL-RS. Here, information indicated by the MAC-CE may include information associated with the periodic PL-RS, such as an identifier of the periodic PL-RS. The identifier of the periodic PL-RS may be an explicit PL-RS identifier or may be an implicit PL-RS identifier indicated by an associated configuration, such as a unified TCI identifier (e.g., joint TCI, uplink TCI, or the like), a spatial relation information identifier for physical uplink shared channel (PUSCH), or a spatial relation information identifier for physical uplink control channel (PUCCH), among other examples. Information indicated by the MAC-CE may further include information associated with the aperiodic PL-RS, such as an aperiodic CSI-RS resource or an CSI-RS resource set. The information associated with the aperiodic PL-RS may include, for example, a CSI trigger state identifier which maps to a CSI report configuration identifier with a quantity of "pathloss." Here, an aperiodic CSI resource set identifier is configured as the CMRs for the CSI report. An offset may also be indicated by the CSI trigger state. In this example TCI information associated with CSI resources in the CSI resource set can be the TCI of the periodic PL-RS, and the offset to the transmission of the aperiodic CSI resource set may be counted from an end of an ACK for the MAC-CE.

As a second particular example, the base station 110 may transmit, and the UE 120 may receive, a MAC-CE activating a periodic PL-RS and a DCI triggering an aperiodic temporary PL-RS. For example, the UE 120 may receive a DCI with a CSI request for a CSI report associated with an aperiodic CSI-RS resource set used for an aperiodic temporary PL-RS. Here, information indicated by the MAC-CE may include information associated with the periodic PL-RS, such as an identifier of the periodic PL-RS. The identifier of the periodic PL-RS may be an explicit PL-RS identifier or may be an implicit PL-RS identifier indicated by an associated configuration, such as a unified TCI identifier (e.g., joint TCI, uplink TCI, or the like), a spatial relation information identifier for PUSCH, or a spatial relation information identifier for PUCCH, among other examples. Information indicated by the DCI may include information associated with the aperiodic PL-RS. The information associated with the aperiodic PL-RS may include, for example, a CSI trigger state identifier which maps to a CSI report configuration identifier with a quantity of "pathloss." Here, an aperiodic CSI resource set identifier is configured as the CMRs for the CSI report. An offset may also be indicated by the CSI trigger state. In this example, TCI information associated with CSI resources in the CSI resource set can be the TCI of the periodic PL-RS and indicated by the trigger state, and the offset to the transmission of the aperiodic CSI resource set may be counted from an end of the DCI reception.

In some aspects, such as when the temporary PL-RS is a semi-persistent PL-RS (e.g., activated by the activation command), the temporary PL-RS is associated with or indicated by a CSI report configuration.

In some aspects, the CSI report configuration indicates a CMR of a semi-persistent PL-RS as the temporary PL-RS. In some aspects, if multiple CMRs are configured in the CSI resource measurement setting to the CSI report configuration, the CMRs are quasi co-located to the periodic PL-RS. Thus, in some aspects, the CMR of the temporary PL-RS is a first CMR, and one or more other CMRs in the CSI measurement resource setting indicated by the CSI report configuration are quasi co-located to the periodic PL-RS. In some aspects, quasi co-location information associated with the one or more other CMRs is indicated by the MAC-CE (e.g., when the temporary PL-RS is a semi-persistent PL-RS activated by the activation command).

As a particular example, the base station 110 may transmit, and the UE 120 may receive, a MAC-CE activating a periodic PL-RS and activating a semi-persistent temporary PL-RS. Here, information indicated by the MAC-CE may include information associated with the periodic PL-RS, such as an identifier of the periodic PL-RS. The identifier of the periodic PL-RS may be an explicit PL-RS identifier or may be an implicit PL-RS identifier indicated by an associated configuration, such as a unified TCI identifier (e.g., joint TCI, uplink TCI, or the like), a spatial relation information identifier for PUSCH, or a spatial relation information identifier for PUCCH, among other examples. Information indicated by the MAC-CE may further include information associated with the semi-persistent PL-RS. The information associated with the semi-persistent PL-RS may include, for example, an identifier associated with a semi-persistent CSI resource set. Here, TCI information associated with CSI resources in the CSI resource set can be the TCI of the periodic PL-RS.

As shown by reference 315, the UE 120 may generate a path loss estimate based at least in part on the temporary PL-RS. For example, the UE 120 may sample the temporary PL-RS and (optionally) the periodic PL-RS to obtain a set of PL-RS measurements. The UE 120 may then generate (e.g., using a path loss estimation algorithm configured on the UE 120) a path loss estimate based at least in part on the set of PL-RS measurements.

As shown by reference 320, the UE 120 may transmit an uplink signal (e.g., a signal carrying an uplink communication, such as a PUCCH communication, a sounding reference signal (SRS) communication, a PUSCH communication, or the like) having a transmit power that is based at least in part on the path loss estimate. For example, the UE 120 may perform uplink power control based at least in part on the path loss estimate in order to determine a transmit power to be used for the transmission of the uplink signal, and the UE 120 may transmit the uplink signal accordingly. In some aspects, the base station 110 may receive the uplink signal transmitted by the UE 120.

As indicated above. FIG. 3 is provided as an example. Other examples may differ from what is described with respect to FIG. 3.

Figure 4:
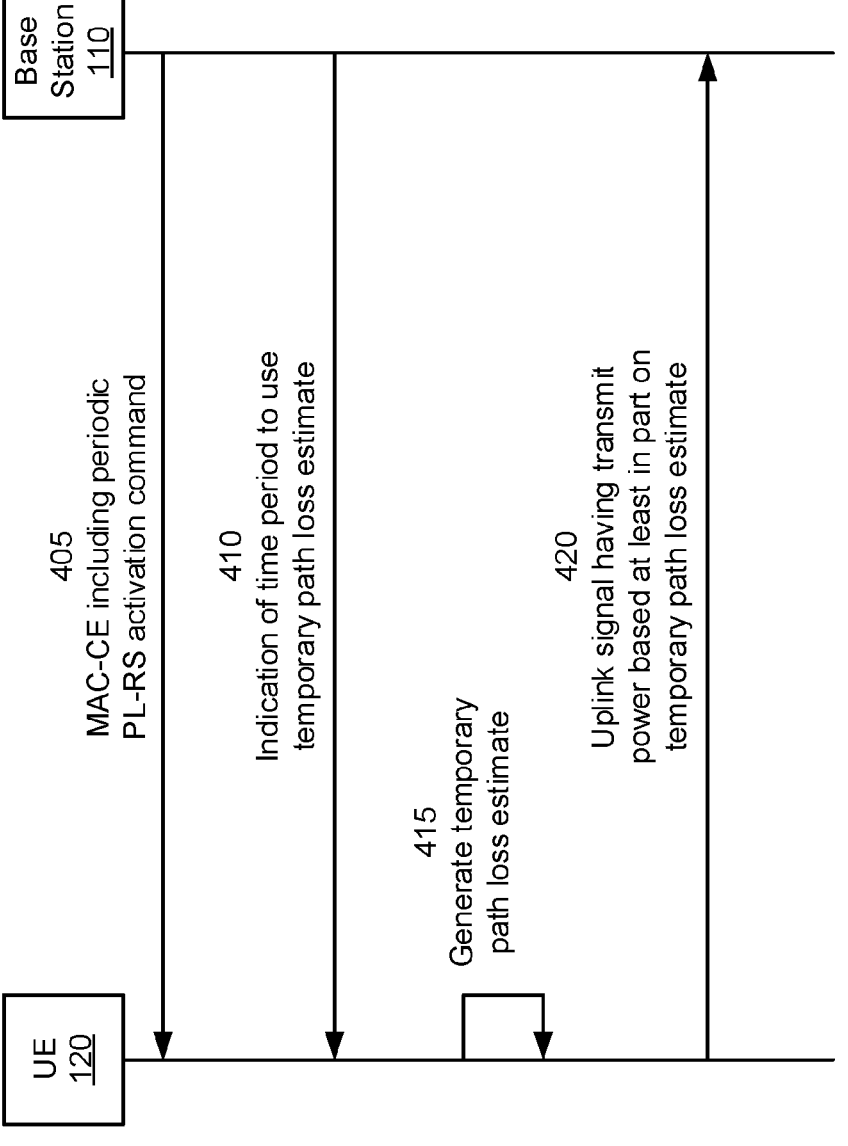

FIG. 4 is a diagram illustrating an example 400 associated with latency reduction for a PL-RS activation, in accordance with the present disclosure. As shown in FIG. 4, a base station 110 and a UE 120 may communicate with one another.

As shown by reference number 405, the base station 110 may transmit, and the UE 120 receive, a MAC-CE including an activation command associated with activating a periodic PL-RS. In some aspects, the MAC-CE can activate multiple (e.g., more than four) uplink TCIs for which the associated PL-RSs can be tracked by the UE. In some aspects, the UE 120 may track the multiple PL-RSs, to avoid frequent MAC-CE activation of the PL-RSs. In some aspects, the quantity of PL-RSs tracked by the UE 120 may be based at least in part on a UE capability.

As shown by reference 410, the base station 110 may transmit, and the UE 120 may receive, an indication of a period of time from an end of an ACK associated with the MAC-CE during which temporary path loss estimates are to be used for the PL-RS.

In some aspects, temporary path loss estimates are path loss estimates that can be used to estimate a path loss on a channel between the base station 110 and the UE 120 during a period of time after transmission of an ACK associated with the MAC-CE (e.g., a period of time immediately following transmission of the ACK). In some aspects, a length of the period of time may be fixed. In some aspects, the length of the period of time may be configured (e.g., by RRC signaling). In some aspects, the length of the period of time may be, for example, 3 ms. In some aspects, a length of the period of time during which temporary path loss estimates can be used is shorter than a length of a period of time associated with generating a normal path loss estimate. In some aspects, use of a temporary path loss estimate reduces an amount of time needed to estimate a path loss on the channel during the period of time (e.g., as compared to an amount of time needed to calculate a typical path loss estimate). As a result, a desirable or required latency associated with the activation of the PL-RS can be achieved.

As shown by reference 415, the UE 120 may generate a temporary path loss estimate. In some implementations, the UE 120 generates the temporary path loss estimate based at least in part on a particular quantity of PL-RS samples obtained during the period of time. For example, the PL-RS (e.g., the PL-RS activated by the MAC-CE) may have an on-demand period of time from the end of ACK for the MAC-CE. Here, during the period of time (which is shorter than a typical PL-RS activation period), the UE may be configured to measure X(X≥1, such as X=5) samples of the PL-RS in association with generating a temporary path loss estimate. Thus, for a given PL-RS, the base station 110 can configure two periods: a shorter period for measuring X PL-RS samples from the end of the ACK for MAC-CE (e.g., during which the UE 120 generates a temporary path loss estimate based on X samples of the PL-RS obtained by the UE 120) and a longer period during which path loss estimates can be generated in a typical manner (e.g., using a quantity of measurements greater than X).

In some aspects, the UE 120 may generate the temporary path loss estimate based at least in part on an RSRP measurement associated with the PL-RS. For example, the UE 120 may be configured to apply an RSRP measurement (e.g., a layer 1 (L1)-RSRP measurement) from the PL-RS activated by the MAC-CE to generate a temporary path loss estimate in a period from the end of the ACK for MAC-CE. Thus, for a given PL-RS, the base station 110 can configure two periods: a shorter period for measuring an RSRP on the PL-RS for generating the temporary path loss estimate from the end of the ACK for the MAC-CE (e.g., during which the RSRP measurement can be applied as the temporary path loss estimate) and a longer period during which path loss estimates can be generated in a typical manner.

As shown by reference 420, the UE 120 may transmit an uplink signal (e.g., a signal carrying an uplink communication, such as a PUCCH communication, a PUSCH communication, or the like) having a transmit power that is based at least in part on the temporary path loss estimate. For example, the UE 120 may perform uplink power control based at least in part on the temporary path loss estimate in order to determine a transmit power to be used for the transmission of the uplink signal and may transmit the uplink signal accordingly. In some aspects, the base station 110 may receive the uplink signal transmitted by the UE 120.

As indicated above. FIG. 4 is provided as an example. Other examples may differ from what is described with respect to FIG. 4.

FIG. 5 is a diagram illustrating an example process 500 performed, for example, by a UE, in accordance with the present disclosure. Example process 500 is an example where the UE (e.g., UE 120) performs operations associated with latency reduction for a PL-RS activation.

As shown in FIG. 5, in some aspects, process 500 may include receiving a MAC-CE including an activation command associated with activating a periodic PL-RS (block 510). For example, the UE (e.g., using communication manager 140 and/or PL-RS component 908 or reception component 902, depicted in FIG. 9) may receive a MAC-CE including an activation command associated with activating a periodic PL-RS, as described above.

As further shown in FIG. 5, in some aspects, process 500 may include receiving an indication associated with a temporary PL-RS, the temporary PL-RS and the periodic PL-RS being used to estimate path loss for a period of time after the reception of the activation command (block 520). For example, the UE (e.g., using communication manager 140 and/or PL-RS component 908 or reception component 902, depicted in FIG. 9) may receive an indication associated with a temporary PL-RS, the temporary PL-RS and the periodic PL-RS being used to estimate path loss for a period of time after the reception of the activation command, as described above.

As further shown in FIG. 5, in some aspects, process 500 may include transmitting an uplink signal having a transmit power based at least in part on a path loss estimate, the path loss estimate being generated based at least in part on the temporary PL-RS and the periodic PL-RS (block 530). For example, the UE (e.g., using communication manager 140 and/or PL-RS component 908 or transmission component 904, depicted in FIG. 9) may transmit an uplink signal having a transmit power based at least in part on a path loss estimate, the path loss estimate being generated based at least in part on the temporary PL-RS and the periodic PL-RS, as described above.

Process 500 may include additional aspects, such as any single aspect or any combination of aspects described below and/or in connection with one or more other processes described elsewhere herein.

In a first aspect, the temporary PL-RS is a semi-persistent PL-RS that is activated by the activation command.

In a second aspect, alone or in combination with the first aspect, the temporary PL-RS is an aperiodic PL-RS that is triggered by the activation command.

In a third aspect, alone or in combination with one or more of the first and second aspects, the temporary PL-RS is an aperiodic PL-RS that is triggered by DCI that is separate from the activation command.

In a fourth aspect, alone or in combination with one or more of the first through third aspects, the temporary PL-RS is quasi co-located with the periodic PL-RS.

In a fifth aspect, alone or in combination with one or more of the first through fourth aspects, the temporary PL-RS is indicated by a CSI trigger state for a CSI report configuration.

In a sixth aspect, alone or in combination with one or more of the first through fifth aspects, the CSI report configuration indicates a CMR of an aperiodic CSI as the temporary PL-RS.

In a seventh aspect, alone or in combination with one or more of the first through sixth aspects, the CMR is a first CMR, and one or more other CMRs indicated by the CSI report configuration are quasi co-located to the periodic PL-RS, wherein quasi co-location information is indicated by the MAC-CE or by DCI.

In an eighth aspect, alone or in combination with one or more of the first through seventh aspects, a CSI report quantity associated with the CSI report configuration is set to "pathloss."

In a ninth aspect, alone or in combination with one or more of the first through eighth aspects, an offset associated with an aperiodic CSI resource set is indicated with the CSI trigger state.

In a tenth aspect, alone or in combination with one or more of the first through ninth aspects, a slot from which the offset is counted is at an end of a slot carrying an ACK associated with the MAC-CE or an end of a slot in which DCI is received.

In an eleventh aspect, alone or in combination with one or more of the first through tenth aspects, repetition is enabled for an aperiodic CSI resource set associated with the CSI report configuration.

In a twelfth aspect, alone or in combination with one or more of the first through eleventh aspects, the temporary PL-RS is indicated by a CSI resource set configuration.

In a thirteenth aspect, alone or in combination with one or more of the first through twelfth aspects, the CSI resource set configuration indicates a CMR of a semi-persistent CSI as the temporary PL-RS.

In a fourteenth aspect, alone or in combination with one or more of the first through thirteenth aspects, the CMR is a first CMR, and one or more other CMRs indicated by the CSI resource set are quasi co-located to the periodic PL-RS, wherein quasi co-location information is indicated by the MAC-CE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a UE, in accordance with the present disclosure. Example process 600 is an example where the UE (e.g., UE 120) performs operations associated with latency reduction for a PL-RS activation.

As shown in FIG. 6, in some aspects, process 600 may include receiving a MAC-CE including an activation command associated with activating a periodic PL-RS (block 610). For example, the UE (e.g., using communication manager 140 and/or PL-RS component 908 or reception component 902, depicted in FIG. 9) may receive a MAC-CE including an activation command associated with activating a periodic PL-RS, as described above.

As further shown in FIG. 6, in some aspects, process 600 may include receiving an indication of a period of time from an end of an ACK associated with the MAC-CE during which temporary path loss estimates are to be used for the PL-RS (block 620). For example, the UE (e.g., using communication manager 140 and/or PL-RS component 908 or reception component 902, depicted in FIG. 9) may receive an indication of a period of time from an end of an ACK associated with the MAC-CE during which temporary path loss estimates are to be used for the PL-RS, as described above.

As further shown in FIG. 6, in some aspects, process 600 may include transmitting an uplink signal having a transmit power based at least in part on a temporary path loss estimate, the temporary path loss estimate being generated based at least in part on the indication (block 630). For example, the UE (e.g., using communication manager 140 and/or PL-RS component 908 or transmission component 904, depicted in FIG. 9) may transmit an uplink signal having a transmit power based at least in part on a temporary path loss estimate, the temporary path loss estimate being generated based at least in part on the indication, as described above.

Process 600 may include additional aspects, such as any single aspect or any combination of aspects described below and/or in connection with one or more other processes described elsewhere herein.

In a first aspect, a length of the period of time is shorter than a length of a period of time associated with generating a normal path loss estimate.

In a second aspect, alone or in combination with the first aspect, the temporary path loss estimate is generated based at least in part on a particular quantity of PL-RS samples obtained during the period of time.

In a third aspect, alone or in combination with one or more of the first and second aspects, the temporary path loss estimate is generated based at least in part on an RSRP measurement associated with the PL-RS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a base station, in accordance with the present disclosure. Example process 700 is an example where the base station (e.g., base station 110) performs operations associated with latency reduction for a PL-RS activation.

As shown in FIG. 7, in some aspects, process 700 may include transmitting a MAC-CE including an activation command associated with activating a periodic PL-RS (block 710). For example, the base station (e.g., using communication manager 150 and/or PL-RS component 1008 or transmission component 1004, depicted in FIG. 10) may transmit a MAC-CE including an activation command associated with activating a periodic PL-RS, as described above.

As further shown in FIG. 7, in some aspects, process 700 may include transmitting an indication associated with a temporary PL-RS, the temporary PL-RS and the periodic PL-RS to be used to estimate path loss for a period of time after the reception of the activation command by a UE (block 720). For example, the base station (e.g., using communication manager 150 and/or PL-RS component 1008 or transmission component 1004, depicted in FIG. 10) may transmit an indication associated with a temporary PL-RS, the temporary PL-RS and the periodic PL-RS to be used to estimate path loss for a period of time after the reception of the activation command by a UE, as described above.

Process 700 may include additional aspects, such as any single aspect or any combination of aspects described below and/or in connection with one or more other processes described elsewhere herein.

In a first aspect, the temporary PL-RS is a semi-persistent PL-RS that is activated by the activation command.

In a second aspect, alone or in combination with the first aspect, the temporary PL-RS is an aperiodic PL-RS that is triggered by the activation command.

In a third aspect, alone or in combination with one or more of the first and second aspects, the temporary PL-RS is an aperiodic PL-RS that is triggered by DCI that is separate from the activation command.

In a fourth aspect, alone or in combination with one or more of the first through third aspects, the temporary PL-RS is quasi co-located with the periodic PL-RS.

In a fifth aspect, alone or in combination with one or more of the first through fourth aspects, the temporary PL-RS is indicated by a CSI trigger state for a CSI report configuration.

In a sixth aspect, alone or in combination with one or more of the first through fifth aspects, the CSI report configuration indicates a CMR of an aperiodic CSI as the temporary PL-RS.

In a seventh aspect, alone or in combination with one or more of the first through sixth aspects, the CMR is a first CMR, and one or more other CMRs indicated by the CSI report configuration are quasi co-located to the periodic PL-RS, wherein quasi co-location information is indicated by the MAC-CE or by DCI.

In an eighth aspect, alone or in combination with one or more of the first through seventh aspects, a CSI report quantity associated with the CSI report configuration is set to "path loss."

In a ninth aspect, alone or in combination with one or more of the first through eighth aspects, an offset associated with an aperiodic CSI resource set is indicated with the CSI trigger state.

In a tenth aspect, alone or in combination with one or more of the first through ninth aspects, a slot from which the offset is counted is at an end of a slot carrying an ACK associated with the MAC-CE or an end of a slot in which DCI is received.

In an eleventh aspect, alone or in combination with one or more of the first through tenth aspects, repetition is enabled for an aperiodic CSI resource set associated with the CSI report configuration.

In a twelfth aspect, alone or in combination with one or more of the first through eleventh aspects, the temporary PL-RS is indicated by a CSI resource set configuration.

In a thirteenth aspect, alone or in combination with one or more of the first through twelfth aspects, the CSI resource set configuration indicates a CMR of a semi-persistent CSI as the temporary PL-RS.

In a fourteenth aspect, alone or in combination with one or more of the first through thirteenth aspects, the CMR is a first CMR, and one or more other CMRs indicated by the CSI resource set are quasi co-located to the periodic PL-RS, wherein quasi co-location information is indicated by the MAC-CE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
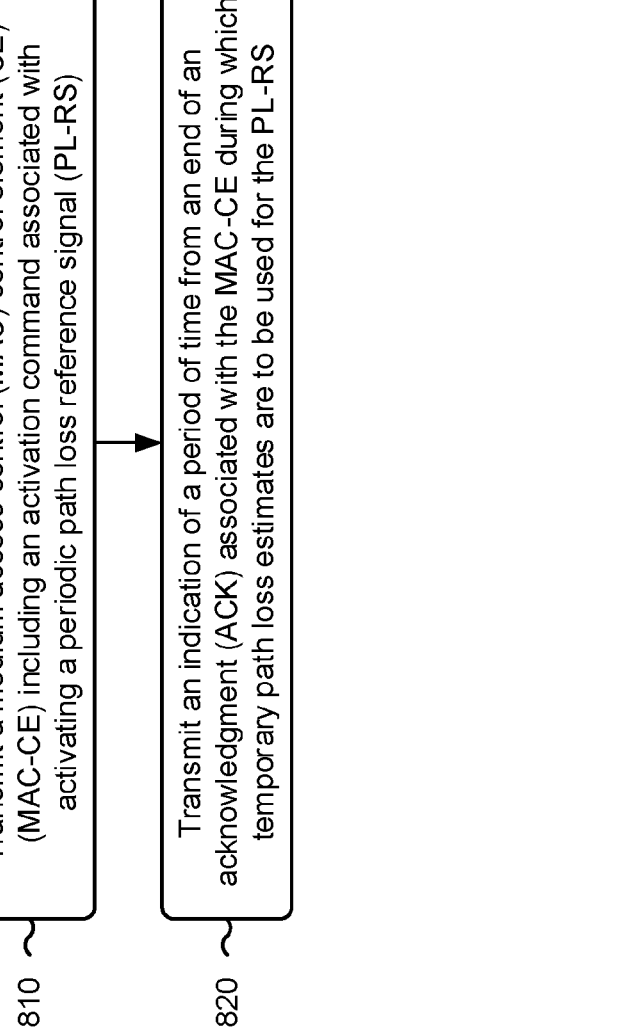

FIG. 8 is a diagram illustrating an example process 800 performed, for example, by a base station, in accordance with the present disclosure. Example process 800 is an example where the base station (e.g., base station 110) performs operations associated with latency reduction for a PL-RS activation.

As shown in FIG. 8, in some aspects, process 800 may include transmitting a MAC-CE including an activation command associated with activating a periodic PL-RS (block 810). For example, the base station (e.g., using communication manager 150 and/or PL-RS component 1008 or transmission component 1004, depicted in FIG. 10)

may transmit a MAC-CE including an activation command associated with activating a periodic PL-RS, as described above.

As further shown in FIG. 8, in some aspects, process 800 may include transmitting an indication of a period of time from an end of an ACK associated with the MAC-CE during which temporary path loss estimates are to be used for the PL-RS (block 820). For example, the base station (e.g., using communication manager 150 and/or PL-RS component 1008 or transmission component 1004, depicted in FIG. 10) may transmit an indication of a period of time from an end of an ACK associated with the MAC-CE during which temporary path loss estimates are to be used for the PL-RS, as described above.

Process 800 may include additional aspects, such as any single aspect or any combination of aspects described below and/or in connection with one or more other processes described elsewhere herein.

In a first aspect, a length of the period of time is shorter than a length of a period of time associated with generating a normal path loss estimate.

In a second aspect, alone or in combination with the first aspect, the temporary path loss estimate is based at least in part on a particular quantity of PL-RS samples obtained during the period of time.

In a third aspect, alone or in combination with one or more of the first and second aspects, the temporary path loss estimate is based at least in part on an RSRP measurement associated with the PL-RS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
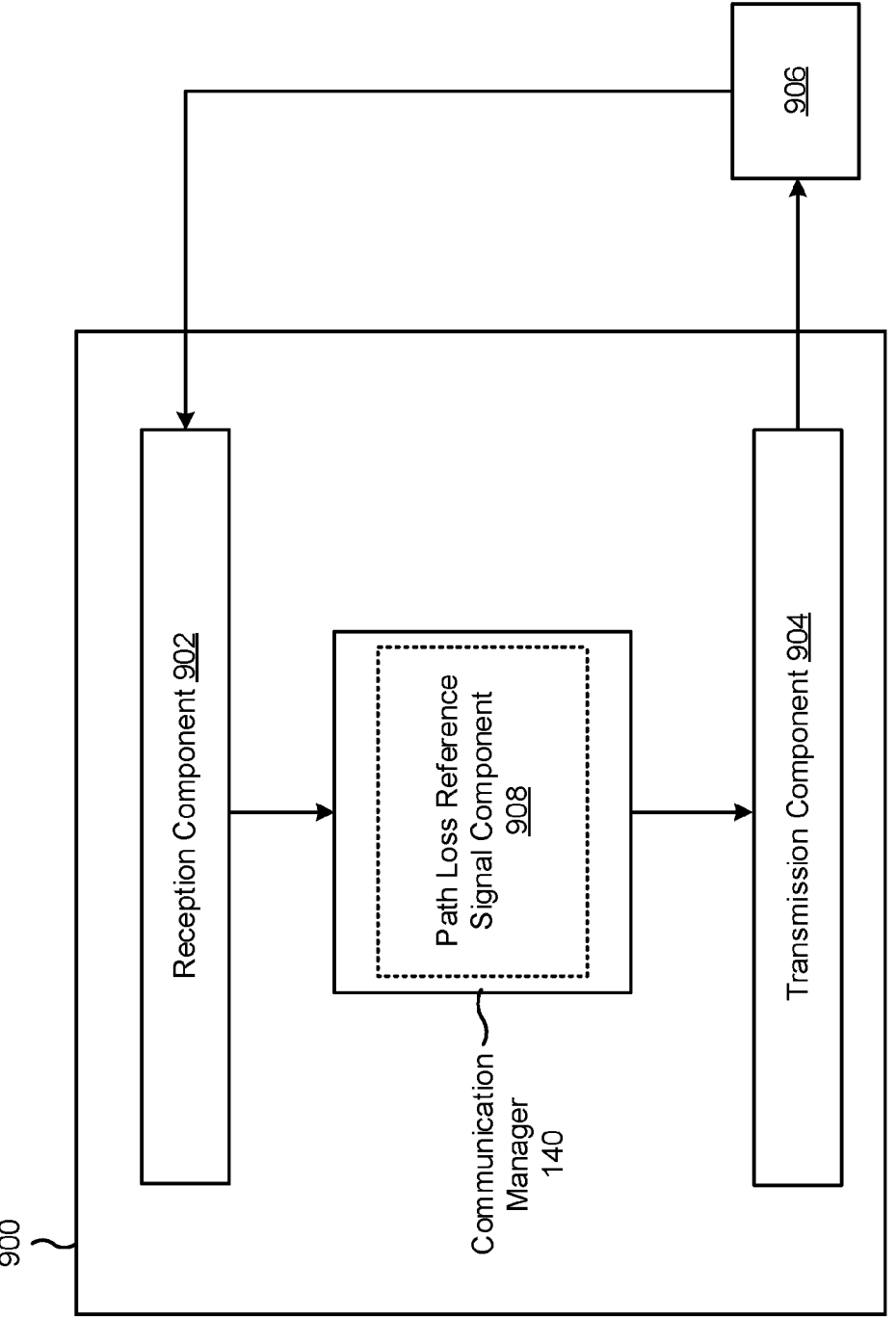
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a PL-RS component 908, among other examples.

In some aspects, the apparatus 900 may be configured to perform one or more operations described herein in connection with FIGS. 3 and 4. Additionally, or alternatively, the apparatus 900 may be configured to perform one or more processes described herein, such as process 500 of FIG. 5, process 600 of FIG. 6, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

In some aspects, the PL-RS component 908 may receive, or may cause the reception component 902 to receive, a MAC-CE including an activation command associated with activating a periodic PL-RS. In some aspects, the PL-RS component 908 may receive, or may cause the reception component 902 to receive, an indication associated with a temporary PL-RS, the temporary PL-RS and the periodic PL-RS being used to estimate path loss for a period of time after the reception of the activation command. In some aspects, the PL-RS component 908 may transmit, or may cause the transmission component 904 to transmit, an uplink signal having a transmit power based at least in part on a path loss estimate, the path loss estimate being generated based at least in part on the temporary PL-RS and the periodic PL-RS.

In some aspects, the PL-RS component 908 may receive, or may cause the reception component 902 to receive, a MAC-CE including an activation command associated with activating a periodic PL-RS. In some aspects, the PL-RS component 908 may receive, or may cause the reception component 902 to receive, an indication of a period of time from an end of an ACK associated with the MAC-CE during which temporary path loss estimates are to be used for the PL-RS. In some aspects, the PL-RS component 908 may transmit, or may cause the transmission component 904 to transmit, an uplink signal having a transmit power based at least in part on a temporary path loss estimate, the temporary path loss estimate being generated based at least in part on the indication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
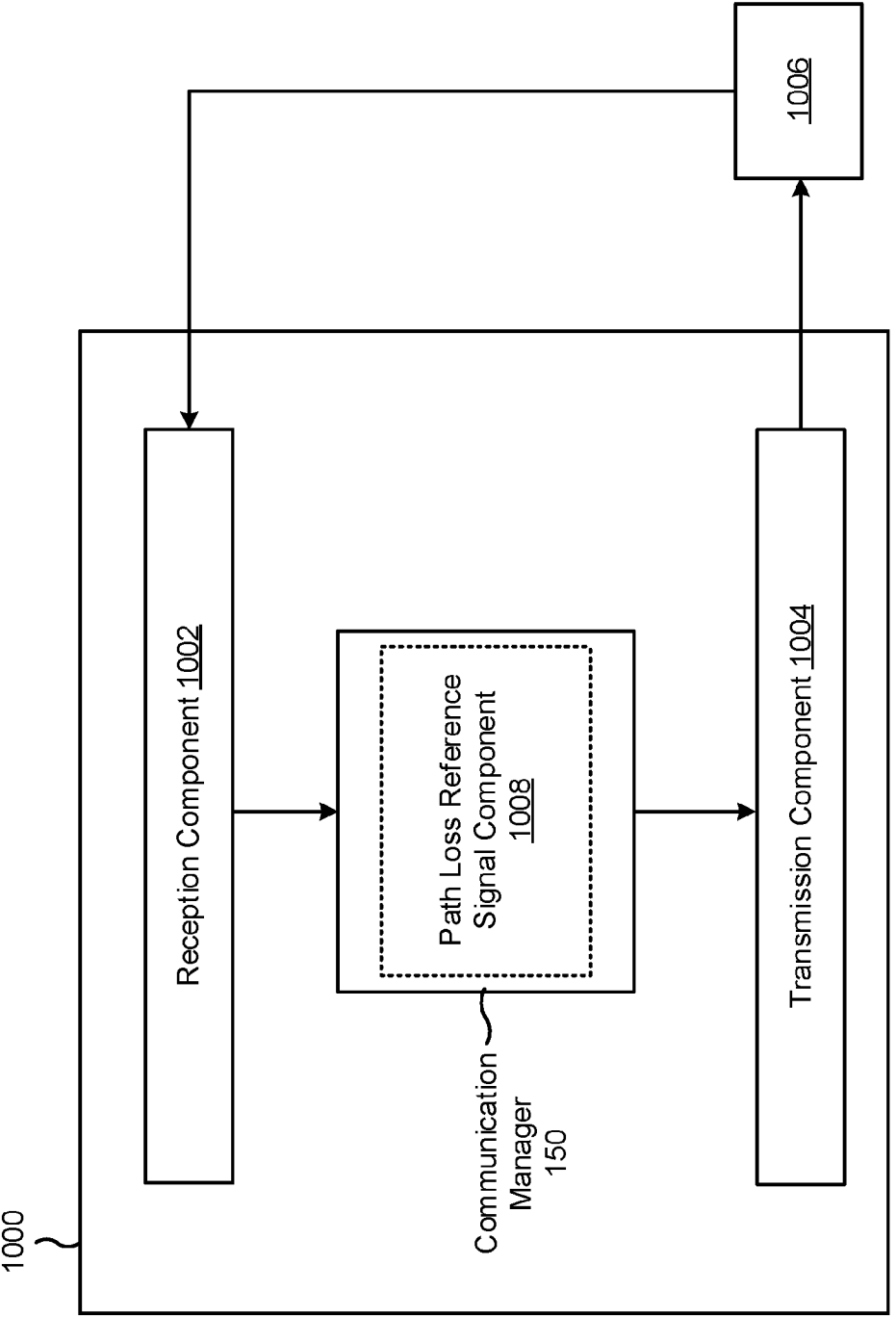

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a PL-RS component 1008, among other examples.

In some aspects, the apparatus 1000 may be configured to perform one or more operations described herein in connection with FIGS. 3 and 4. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the base station described in connection with FIG. 2. Additionally. or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

In some aspects, the PL-RS component 908 may transmit, or may cause the transmission component 1004 to transmit, a MAC-CE including an activation command associated with activating a periodic PL-RS. In some aspects, the PL-RS component 908 may transmit, or may cause the transmission component 1004 to transmit, an indication associated with a temporary PL-RS, the temporary PL-RS and the periodic PL-RS to be used to estimate path loss for a period of time after the reception of the activation command by a UE.

In some aspects, the PL-RS component 908 may transmit, or may cause the transmission component 1004 to transmit, a MAC-CE including an activation command associated with activating a periodic PL-RS. In some aspects, the PL-RS component 908 may transmit, or may cause the transmission component 1004 to transmit, an indication of a period of time from an end of an ACK associated with the MAC-CE during which temporary path loss estimates are to be used for the PL-RS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a medium access control (MAC) control element (CE) (MAC-CE) including an activation command associated with activating a periodic path loss reference signal (PL-RS): receiving an indication associated with a temporary PL-RS, the temporary PL-RS and the periodic PL-RS being used to estimate path loss for a period of time after the reception of the activation command: and transmitting an uplink signal having a transmit power based at least in part on a path loss estimate, the path loss estimate being generated based at least in part on the temporary PL-RS and the periodic PL-RS.

Aspect 2: The method of Aspect 1, wherein the temporary PL-RS is a semi-persistent PL-RS that is activated by the activation command.

Aspect 3: The method of Aspect 1, wherein the temporary PL-RS is an aperiodic PL-RS that is triggered by the activation command.

Aspect 4: The method of Aspect 1, wherein the temporary PL-RS is an aperiodic PL-RS that is triggered by downlink control information (DCI) that is separate from the activation command.

Aspect 5: The method of any of Aspects 1-4, wherein the temporary PL-RS is quasi co-located with the periodic PL-RS.

Aspect 6: The method of any of Aspects 1 and 3-5, wherein the temporary PL-RS is indicated by a channel state information (CSI) trigger state for a CSI report configuration.

Aspect 7: The method of Aspect 6, wherein the CSI report configuration indicates a channel measurement resource (CMR) of an aperiodic CSI as the temporary PL-RS.

Aspect 8: The method of Aspect 7, wherein the CMR is a first CMR, and one or more other CMRs indicated by the CSI report configuration are quasi co-located to the periodic PL-RS, wherein quasi co-location information is indicated by the MAC-CE or by downlink control information (DCI).

Aspect 9: The method of any of Aspects 6-8, wherein a CSI report quantity associated with the CSI report configuration is set to "pathloss."

Aspect 10: The method of any of Aspects 6-9, wherein an offset associated with an aperiodic CSI resource set is indicated with the CSI trigger state.

Aspect 11: The method of Aspect 10, wherein a slot from which the offset is counted is at an end of a slot carrying an acknowledgment (ACK) associated with the MAC-CE or an end of a slot in which downlink control information (DCI) is received.

Aspect 12: The method of any of Aspects 6-11, wherein repetition is enabled for an aperiodic CSI resource set associated with the CSI report configuration.

Aspect 13: The method of any of Aspects 1-2, wherein the temporary PL-RS is indicated by a CSI resource set configuration.

Aspect 14: The method of Aspect 13, wherein the CSI resource set configuration indicates a channel measurement resource (CMR) of a semi-persistent CSI as the temporary PL-RS.

Aspect 15: The method of Aspect 14, wherein the CMR is a first CMR, and one or more other CMRs indicated by the CSI resource set are quasi co-located to the periodic PL-RS, wherein quasi co-location information is indicated by the MAC-CE.

Aspect 16: A method of wireless communication performed by a user equipment (UE), comprising: receiving a medium access control (MAC) control element (CE) (MAC-CE) including an activation command associated with activating a periodic path loss reference signal (PL-RS): receiving an indication of a period of time from an end of an acknowledgment (ACK) associated with the MAC-CE during which temporary path loss estimates are to be used for the PL-RS: and transmitting an uplink signal having a transmit power based at least in part on a temporary path loss estimate, the temporary path loss estimate being generated based at least in part on the indication.

Aspect 17: The method of Aspect 16, wherein a length of the period of time is shorter than a length of a period of time associated with generating a normal path loss estimate.

Aspect 18: The method of any of Aspects 16-17, wherein the temporary path loss estimate is generated based at least in part on a particular quantity of PL-RS samples obtained during the period of time.

Aspect 19: The method of any of Aspects 16-17, wherein the temporary path loss estimate is generated based at least in part on a reference signal received power (RSRP) measurement associated with the PL-RS.

Aspect 20: A method of wireless communication performed by a base station, comprising: transmitting a medium access control (MAC) control element (CE) (MAC-CE) including an activation command associated with activating a periodic path loss reference signal (PL-RS): and transmitting an indication associated with a temporary PL-RS, the temporary PL-RS and the periodic PL-RS to be used to estimate path loss for a period of time after the reception of the activation command by a user equipment (UE).

Aspect 21: The method of Aspect 20, wherein the temporary PL-RS is a semi-persistent PL-RS that is activated by the activation command.

Aspect 22: The method of Aspect 20, wherein the temporary PL-RS is an aperiodic PL-RS that is triggered by the activation command.

Aspect 23: The method of Aspect 20, wherein the temporary PL-RS is an aperiodic PL-RS that is triggered by downlink control information (DCI) that is separate from the activation command.

Aspect 24: The method of any of Aspects 20-23, wherein the temporary PL-RS is quasi co-located with the periodic PL-RS.

Aspect 25: The method of any of Aspects 20 or 22-23, wherein the temporary PL-RS is indicated by a channel state information (CSI) trigger state for a CSI report configuration.

Aspect 26: The method of Aspect 25, wherein the CSI report configuration indicates a channel measurement resource (CMR) of an aperiodic CSI as the temporary PL-RS.

Aspect 27: The method of Aspect 26, wherein the CMR is a first CMR, and one or more other CMRs indicated by the CSI report configuration are quasi co-located to the periodic PL-RS, wherein quasi co-location information is indicated by the MAC-CE or by downlink control information (DCI).

Aspect 28: The method of any of Aspects 25-27, wherein a CSI report quantity associated with the CSI report configuration is set to "path loss."

Aspect 29: The method of any of Aspects 25-28, wherein an offset associated with an aperiodic CSI resource set is indicated with the CSI trigger state.

Aspect 30: The method of Aspect 29, wherein a slot from which the offset is counted is at an end of a slot carrying an acknowledgment (ACK) associated with the MAC-CE or an end of a slot in which downlink control information (DCI) is received.

Aspect 31: The method of any of Aspects 25-30, wherein repetition is enabled for an aperiodic CSI resource set associated with the CSI report configuration.

Aspect 32: The method of any of Aspects 20-21, wherein the temporary PL-RS is indicated by a CSI resource set configuration.

Aspect 33: The method of Aspect 32, wherein the CSI resource set configuration indicates a channel measurement resource (CMR) of a semi-persistent CSI as the temporary PL-RS.

Aspect 34: The method of Aspect 33, wherein the CMR is a first CMR, and one or more other CMRs indicated by the CSI resource set are quasi co-located to the periodic PL-RS, wherein quasi co-location information is indicated by the MAC-CE.

Aspect 35: A method of wireless communication performed by a base station, comprising: transmitting a medium access control (MAC) control element (CE) (MAC-CE) including an activation command associated with activating a periodic path loss reference signal (PL-RS): and transmitting an indication of a period of time from an end of an acknowledgment (ACK) associated with the MAC-CE during which temporary path loss estimates are to be used for the PL-RS.

Aspect 36: The method of Aspect 35, wherein a length of the period of time is shorter than a length of a period of time associated with generating a normal path loss estimate.

Aspect 37: The method of any of Aspects 35-36, wherein the temporary path loss estimate is based at least in part on a particular quantity of PL-RS samples obtained during the period of time.

Aspect 38: The method of any of Aspects 35-36, wherein the temporary path loss estimate is based at least in part on a reference signal received power (RSRP) measurement associated with the PL-RS.

Aspect 39: An apparatus for wireless communication at a device, comprising a processor; memory coupled with the processor: and instructions stored in the memory and executable by the processor to cause the apparatus to perform the method of one or more of Aspects 1-15.

Aspect 40: A device for wireless communication, comprising a memory and one or more processors coupled to the memory, the one or more processors configured to perform the method of one or more of Aspects 1-15.

Aspect 41: An apparatus for wireless communication, comprising at least one means for performing the method of one or more of Aspects 1-15.

Aspect 42: A non-transitory computer-readable medium storing code for wireless communication, the code comprising instructions executable by a processor to perform the method of one or more of Aspects 1-15.

Aspect 43: A non-transitory computer-readable medium storing a set of instructions for wireless communication, the set of instructions comprising one or more instructions that, when executed by one or more processors of a device, cause the device to perform the method of one or more of Aspects 1-15.

Aspect 44: An apparatus for wireless communication at a device, comprising a processor; memory coupled with the processor: and instructions stored in the memory and executable by the processor to cause the apparatus to perform the method of one or more of Aspects 16-19.

Aspect 45: A device for wireless communication, comprising a memory and one or more processors coupled to the memory, the one or more processors configured to perform the method of one or more of Aspects 16-19.

Aspect 46: An apparatus for wireless communication, comprising at least one means for performing the method of one or more of Aspects 16-19.

Aspect 47: A non-transitory computer-readable medium storing code for wireless communication, the code comprising instructions executable by a processor to perform the method of one or more of Aspects 16-19.

Aspect 48: A non-transitory computer-readable medium storing a set of instructions for wireless communication, the set of instructions comprising one or more instructions that, when executed by one or more processors of a device, cause the device to perform the method of one or more of Aspects 16-19.

Aspect 49: An apparatus for wireless communication at a device, comprising a processor; memory coupled with the processor: and instructions stored in the memory and executable by the processor to cause the apparatus to perform the method of one or more of Aspects 20-34.

Aspect 50: A device for wireless communication, comprising a memory and one or more processors coupled to the memory, the one or more processors configured to perform the method of one or more of Aspects 20-34.

Aspect 51: An apparatus for wireless communication, comprising at least one means for performing the method of one or more of Aspects 20-34.

Aspect 52: A non-transitory computer-readable medium storing code for wireless communication, the code comprising instructions executable by a processor to perform the method of one or more of Aspects 20-34.

Aspect 53: A non-transitory computer-readable medium storing a set of instructions for wireless communication, the set of instructions comprising one or more instructions that, when executed by one or more processors of a device, cause the device to perform the method of one or more of Aspects 20-34.

Aspect 54: An apparatus for wireless communication at a device, comprising a processor; memory coupled with the processor: and instructions stored in the memory and executable by the processor to cause the apparatus to perform the method of one or more of Aspects 35-38.

Aspect 55: A device for wireless communication, comprising a memory and one or more processors coupled to the memory, the one or more processors configured to perform the method of one or more of Aspects 35-38.

Aspect 56: An apparatus for wireless communication, comprising at least one means for performing the method of one or more of Aspects 35-38.

Aspect 57: A non-transitory computer-readable medium storing code for wireless communication, the code comprising instructions executable by a processor to perform the method of one or more of Aspects 35-38.

Aspect 58: A non-transitory computer-readable medium storing a set of instructions for wireless communication, the set of instructions comprising one or more instructions that, when executed by one or more processors of a device, cause the device to perform the method of one or more of Aspects 35-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example. "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving a medium access control (MAC) control element (CE) (MAC-CE) including an activation command associated with activating a periodic path loss reference signal (PL-RS);
receiving an indication associated with a temporary PL-RS, the temporary PL-RS and the periodic PL-RS being used to estimate path loss for a period of time after the reception of the activation command; and
transmitting an uplink signal having a transmit power based at least in part on a path loss estimate, the path loss estimate being generated based at least in part on the temporary PL-RS and the periodic PL-RS.

2. The method of claim 1, wherein the temporary PL-RS is a semi-persistent PL-RS that is activated by the activation command.

3. The method of claim 1, wherein the temporary PL-RS is an aperiodic PL-RS that is triggered by the activation command.

4. The method of claim 1, wherein the temporary PL-RS is an aperiodic PL-RS that is triggered by downlink control information (DCI) that is separate from the activation command.

5. The method of claim 1, wherein the temporary PL-RS is quasi co-located with the periodic PL-RS.

6. The method of claim 1, wherein the temporary PL-RS is indicated by a channel state information (CSI) trigger state for a CSI report configuration.

7. The method of claim 6, wherein the CSI report configuration indicates a channel measurement resource (CMR) of an aperiodic CSI as the temporary PL-RS.

8. The method of claim 6, wherein a CSI report quantity associated with the CSI report configuration is set to "pathloss".

9. The method of claim 6, wherein an offset associated with an aperiodic CSI resource set is indicated with the CSI trigger state.

10. The method of claim 6, wherein repetition is enabled for an aperiodic CSI resource set associated with the CSI report configuration.

11. The method of claim 1, wherein the temporary PL-RS is indicated by a CSI resource set configuration.

12. The method of claim 11, wherein the CSI resource set configuration indicates a channel measurement resource (CMR) of a semi-persistent CSI as the temporary PL-RS.

13. A method of wireless communication performed by a user equipment (UE), comprising:

receiving a medium access control (MAC) control element (CE) (MAC-CE) including an activation command associated with activating a periodic path loss reference signal (PL-RS);

receiving an indication of a period of time from an end of an acknowledgment (ACK) associated with the MAC-CE during which temporary path loss estimates are to be used for the PL-RS; and transmitting an uplink signal having a transmit power based at least in part on a temporary path loss estimate, the temporary path loss estimate being generated based at least in part on the indication.

14. The method of claim 13, wherein a length of the period of time is shorter than a length of a period of time associated with generating a normal path loss estimate.

15. The method of claim 13, wherein the temporary path loss estimate is generated based at least in part on a particular quantity of PL-RS samples obtained during the period of time.

16. The method of claim 13, wherein the temporary path loss estimate is generated based at least in part on a reference signal received power (RSRP) measurement associated with the PL-RS.

17. A method of wireless communication performed by a base station, comprising:

transmitting a medium access control (MAC) control element (CE) (MAC-CE) including an activation command associated with activating a periodic path loss reference signal (PL-RS); and transmitting an indication associated with a temporary PL-RS, the temporary PL-RS and the periodic PL-RS to be used to estimate path loss for a period of time after the reception of the activation command by a user equipment (UE).

18. The method of claim 17, wherein the temporary PL-RS is a semi-persistent PL-RS that is activated by the activation command.

19. The method of claim 17, wherein the temporary PL-RS is an aperiodic PL-RS that is triggered by the activation command.

20. The method of claim 17, wherein the temporary PL-RS is an aperiodic PL-RS that is triggered by downlink control information (DCI) that is separate from the activation command.

21. The method of claim 17, wherein the temporary PL-RS is quasi co-located with the periodic PL-RS.

22. The method of claim 17, wherein the temporary PL-RS is indicated by a channel state information (CSI) trigger state for a CSI report configuration.

23. The method of claim 22, wherein the CSI report configuration indicates a channel measurement resource (CMR) of an aperiodic CSI as the temporary PL-RS.

24. The method of claim 22, wherein a CSI report quantity associated with the CSI report configuration is set to "path loss".

25. The method of claim 22, wherein an offset associated with an aperiodic CSI resource set is indicated with the CSI trigger state.

26. The method of claim 22, wherein repetition is enabled for an aperiodic CSI resource set associated with the CSI report configuration.

27. The method of claim 17, wherein the temporary PL-RS is indicated by a CSI resource set configuration.

28. The method of claim 27, wherein the CSI resource set configuration indicates a channel measurement resource (CMR) of a semi-persistent CSI as the temporary PL-RS.

29. A method of wireless communication performed by a base station, comprising:

transmitting a medium access control (MAC) control element (CE) (MAC-CE) including an activation command associated with activating a periodic path loss reference signal (PL-RS); and transmitting an indication of a period of time from an end of an acknowledgment (ACK) associated with the MAC-CE during which temporary path loss estimates are to be used for the PL-RS.

30. The method of claim 29, wherein a length of the period of time is shorter than a length of a period of time associated with generating a normal path loss estimate.

\* \* \* \* \*